(12) United States Patent
Naito et al.

(10) Patent No.: US 9,387,765 B2
(45) Date of Patent: Jul. 12, 2016

(54) VEHICLE BRAKING CONTROL DEVICE

(71) Applicant: ADVICS CO., LTD., Kariya (JP)

(72) Inventors: Masayuki Naito, Nagakute (JP); Tomokazu Kato, Kariya (JP)

(73) Assignee: ADVICS CO., LTD., Kariya, Aichi-Pref (JP)

( * ) Notice: Subject to any disclaimer, the term of this patent is extended or adjusted under 35 U.S.C. 154(b) by 0 days.

(21) Appl. No.: 14/497,791

(22) Filed: Sep. 26, 2014

(65) Prior Publication Data
US 2015/0123457 A1 May 7, 2015

(30) Foreign Application Priority Data
Sep. 26, 2013 (JP) ................. 2013-199739

(51) Int. Cl.
| B60T 8/64 | (2006.01) |
| B60L 7/26 | (2006.01) |
| B60T 13/58 | (2006.01) |
| B60T 1/10 | (2006.01) |
| B60L 7/14 | (2006.01) |
| B60L 11/12 | (2006.01) |
| B60L 11/14 | (2006.01) |
| B60L 15/20 | (2006.01) |

(52) U.S. Cl.
CPC ... *B60L 7/26* (2013.01); *B60L 7/14* (2013.01); *B60L 11/123* (2013.01); *B60L 11/14* (2013.01); *B60L 15/2009* (2013.01); *B60T 1/10* (2013.01); *B60T 13/586* (2013.01); *B60L 2210/40* (2013.01); *B60L 2240/12* (2013.01); *B60L 2240/421* (2013.01); *B60L 2240/423* (2013.01); *B60L 2240/80* (2013.01); *B60L 2250/26* (2013.01); *Y02T 10/6217* (2013.01); *Y02T 10/645* (2013.01); *Y02T 10/7077* (2013.01); *Y02T 10/7241* (2013.01); *Y02T 10/7275* (2013.01)

(58) Field of Classification Search
CPC .................................................. B60T 13/586
USPC ................................................ 303/151, 152
See application file for complete search history.

(56) References Cited

U.S. PATENT DOCUMENTS

2005/0269875 A1   12/2005  Maki et al.
2007/0228821 A1 *  10/2007  Maki et al. ............... 303/151

(Continued)

FOREIGN PATENT DOCUMENTS

JP     2006-96218 A    4/2006
JP     2008-179191 A   8/2008

(Continued)

*Primary Examiner* — Thomas J Williams
(74) *Attorney, Agent, or Firm* — Buchanan Ingersoll & Rooney PC

(57) ABSTRACT

A vehicle braking control device of the invention includes, when a direction in which a brake operating member is displaced to increase the hydraulic pressure in a master chamber is assumed to be an operating direction, a correlation value output unit that outputs a correlation value that correlates to an amount of decrease in operational reaction force acting on the brake operating member in a direction opposite to the operating direction during a braking operation, prior to start of the switching control; and a control unit that controls the regenerative braking device so that, as the amount of decrease in operational reaction force indicated by the correlation value being output from the correlation value output unit is large, the regenerative braking force at the start of the switching control decreases.

9 Claims, 9 Drawing Sheets

(56) References Cited

U.S. PATENT DOCUMENTS

| | | |
|---|---|---|
| 2008/0174173 A1 | 7/2008 | Kokubo et al. |
| 2013/0020857 A1 | 1/2013 | Fujii |
| 2014/0054955 A1* | 2/2014 | Ninoyu et al. .................. 303/11 |

FOREIGN PATENT DOCUMENTS

| | | |
|---|---|---|
| JP | 2008-295266 A | 12/2008 |
| JP | 2013-023004 A | 2/2013 |

* cited by examiner

VEHICLE SPEED
VS

BRAKING FORCE
BP

HYDRAULIC
BRAKING FORCE
BPP

VEHICLE BRAKING CONTROL DEVICE

TECHNOLOGICAL FIELD

The present invention relates to a vehicle braking control device that is applied to a vehicle equipped with a regenerative braking device and a hydraulic braking device.

BACKGROUND DISCUSSION

JP 2006-96218 A discloses an example of a hydraulic braking device that is capable of controlling a braking force with respect to a vehicle in cooperation with a regenerative braking device. The device is equipped with a brake actuator that adjusts a differential pressure between a master cylinder configured to generate a master cylinder pressure as a hydraulic pressure depending on a braking operation of a driver inside a master chamber and a wheel cylinder provided for a wheel. The brake actuator is a so-called inline type actuator that has a differential pressure regulating valve disposed in a pathway between the master cylinder and the wheel cylinder, and a supply pump that pumps up the brake fluid from the interior of the master chamber of the master cylinder and discharges the brake fluid to the pathway of the wheel cylinder side rather than the differential pressure regulating valve.

In such a hydraulic braking device, in order to give the braking force corresponding to a difference, which is obtained by subtracting the regenerative braking force applied to the vehicle by the regenerative braking device from the target braking force depending on an amount of braking operation of the driver, to the vehicle, a brake actuator is operated. It should be noted that the braking force applied to the vehicle by the hydraulic braking device will be referred to as "hydraulic braking force".

Here, it is difficult to control the regenerative braking force applied to the vehicle by the regenerative braking device compared to the hydraulic braking force applied to the vehicle by the hydraulic braking device. For that reason, when the vehicle speed of the vehicle is lowered by the braking operation of the driver, and the vehicle speed becomes lower than the switching start speed, a so-called switching control is performed which gradually decreases the regenerative braking force and gradually increases the hydraulic braking force in accordance with a decrease in the vehicle speed. Moreover, when the vehicle speed reaches the switching termination speed greater than "0 (zero)", since the regenerative braking force is "0 (zero)", the switching control is terminated. Thereafter, the brake actuator is controlled so that the hydraulic braking force coincides with the required braking force depending on a braking operation of the driver.

Incidentally, when increasing the hydraulic braking force so as to compensate the decrease of the regenerative braking force in the above-described switching control, the brake actuator is actuated so that the differential pressure between the master cylinder and the wheel cylinder gradually increases. At this time, the brake fluid is pumped up from the interior of the master chamber of the master cylinder by the supply pump of the brake actuator and is supplied into the wheel cylinder. Then, a master piston moves in a direction of increasing the master cylinder pressure in accordance with a decrease in the brake fluid from the master chamber, and the operational reaction force acting on the brake pedal decreases. The operational reaction force is a force which acts on the brake pedal in an opposite direction to the braking operation force of the driver. For that reason, in a case where the braking operation force of the driver is approximately constant, when the operational reaction force decreases in this manner, a brake pedal drivingly connected to the master piston is displaced. That is, even if the driver himself does not increase the braking operation force, the brake pedal is displaced in the operating direction as a direction of increasing the master cylinder pressure, and there is a risk of a decrease in drivability.

SUMMARY

An object of the invention is to provide a vehicle braking control device that is capable of suppressing a decrease in drivability when carrying out a switching control that decreases the regenerative braking force and increases the hydraulic braking force in accordance with deceleration of the vehicle during braking operation.

The vehicle braking control device according to the invention is applied to a vehicle that is equipped with a regenerative braking device that gives a regenerative braking force to the vehicle; and a hydraulic braking device that has a differential pressure regulating valve disposed in a pathway between a master cylinder configured to generate the hydraulic pressure depending on a braking operation within a master chamber and a wheel cylinder provided for a wheel, and a supply pump configured to pump up the brake fluid from the interior of the master chamber and discharge the brake fluid to the pathway of the wheel cylinder side rather than the differential pressure regulating valve, and generates a hydraulic braking force with respect to the vehicle, by adjusting the differential pressure between the master cylinder and the wheel cylinder by the operation of the differential pressure regulating valve and the supply pump. Such a braking control device is assumed to be a device that performs a switching control which decreases the regenerative braking force by controlling the regenerative braking device and increases the hydraulic braking force by pumping up the brake fluid from the master chamber by the supply pump and supplying the brake fluid into the wheel cylinder, in conjunction with deceleration of the vehicle during braking operation in which a brake operating member is operated.

When the vehicle speed of the vehicle decreases by operation of the brake operating member by the driver, that is, by the braking operation, the switching control is started. Moreover, when the switching control is started, in accordance with the deceleration of the vehicle, the regenerative braking force decreases, and the hydraulic braking force increases. When increasing the hydraulic braking force in this manner, between the differential pressure regulating valve and the supply pump of the brake actuator, at least the supply pump is operated, and the differential pressure between the master cylinder and the wheel cylinder increases. In addition, in the switching control, as the regenerative braking force at the time of start of the switching control is great, the amount of increase in hydraulic braking force replaced with the regenerative braking force is large. Accordingly, the differential pressure between the master cylinder and the wheel cylinder increases.

During operation of the pump, since the brake fluid in the master chamber decreases by the brake fluid in the master chamber of the master cylinder pumped by the supply pump, in the master cylinder, the master piston moves in a direction of increasing the hydraulic pressure in the master chamber. This reduces the operational reaction force acting on the brake pedal. As a result, when the braking operation force by the driver is approximately constant, a brake operating member drivingly connected to the master piston is displaced in the operating direction. In addition, as the amount of brake fluid reduced from the interior of the master chamber by the operation of the supply pump increases, an amount of displacement of the brake operating member in the operating direction increases.

Therefore, when a direction in which the brake operating member is displaced to increase the hydraulic pressure in the master chamber is assumed to be an operating direction, the vehicle braking control device of the invention is provided with a correlation value output unit that outputs a correlation value correlating to an amount of decrease in the operational reaction force acting on the brake operating member in an opposite direction to the operating direction during the braking operation, prior to the start of the switching control, and a control unit that controls the regenerative braking device so that, as the amount of decrease in operational reaction force indicated by the correlation value being output from the correlation value output unit is large, the regenerative braking force at the start of the switching control decreases.

In the above-described configuration, during the braking operation of the driver, the correlation value is output from the correlation value output unit before the start of the switching control. Moreover, it is predicted that, as the amount of decrease in the operational reaction force indicated by the correlation value is large, the amount of decrease in the brake fluid from the interior of the master chamber according to the switching control increases. For that reason, the regenerative braking device is controlled so that, as the amount of decrease in the operational reaction force indicated by the correlation value being output from the correlation value output unit is large, the regenerative braking force decreases at the time when the switching control is actually started. Thus, the amount of increase in the hydraulic braking force decreases when the switching control is actually performed, and the amount of brake fluid reduced from the interior of the master chamber by operation of the supply pump during the switching control decreases. As a result, the amount of displacement of the brake operating member in the operating direction due to the implementation of the switching control is hard to increase. Therefore, it is possible to suppress a decrease in drivability when performing the switching control.

BRIEF DESCRIPTION OF THE DRAWING FIGURES

FIG. 5A illustrates a transition of vehicle speed, FIG. 5B illustrates a transition of required braking force and regenerative braking force, and FIG. 5C illustrates a transition of hydraulic braking force;

Figure 10:
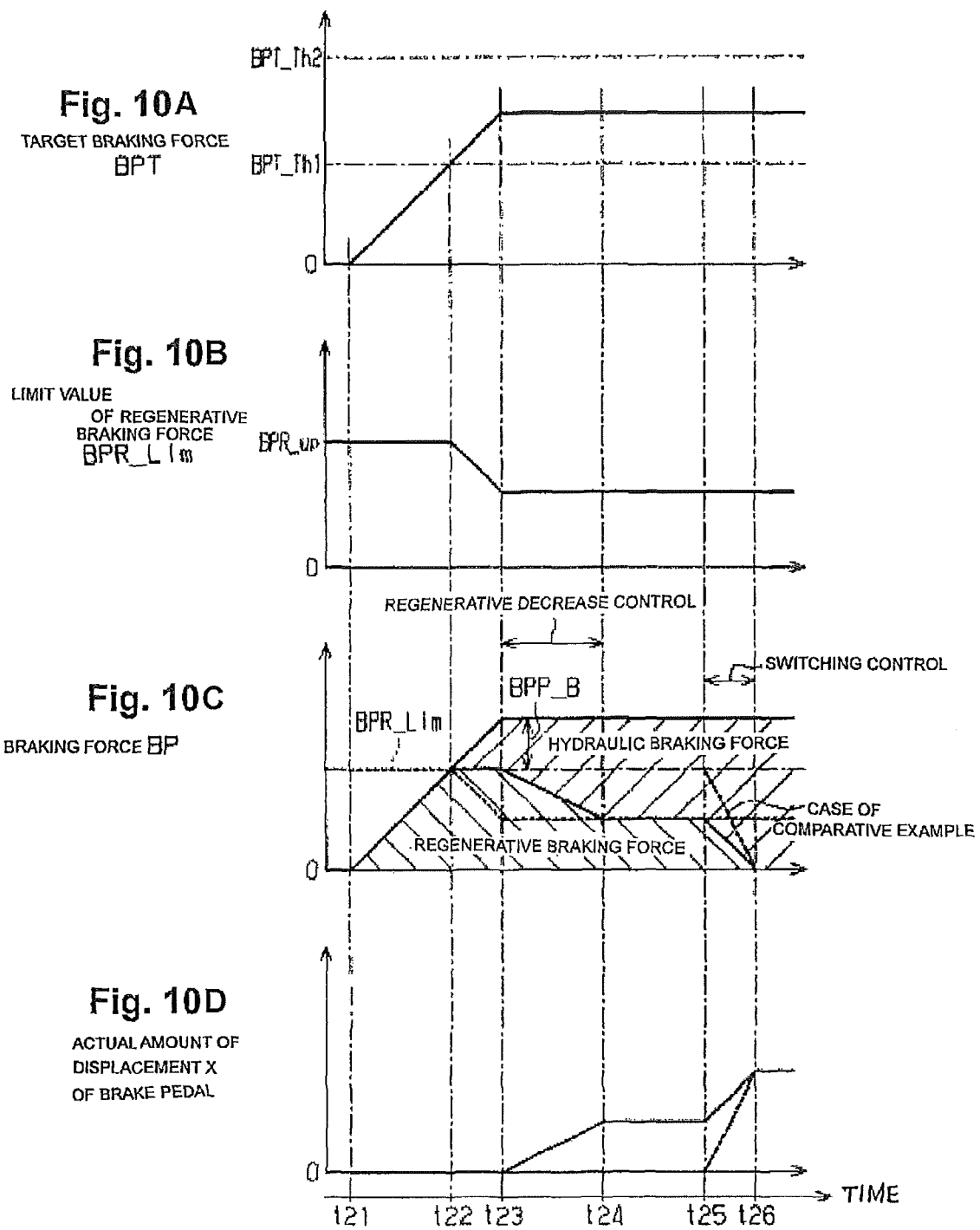
Figure 11:
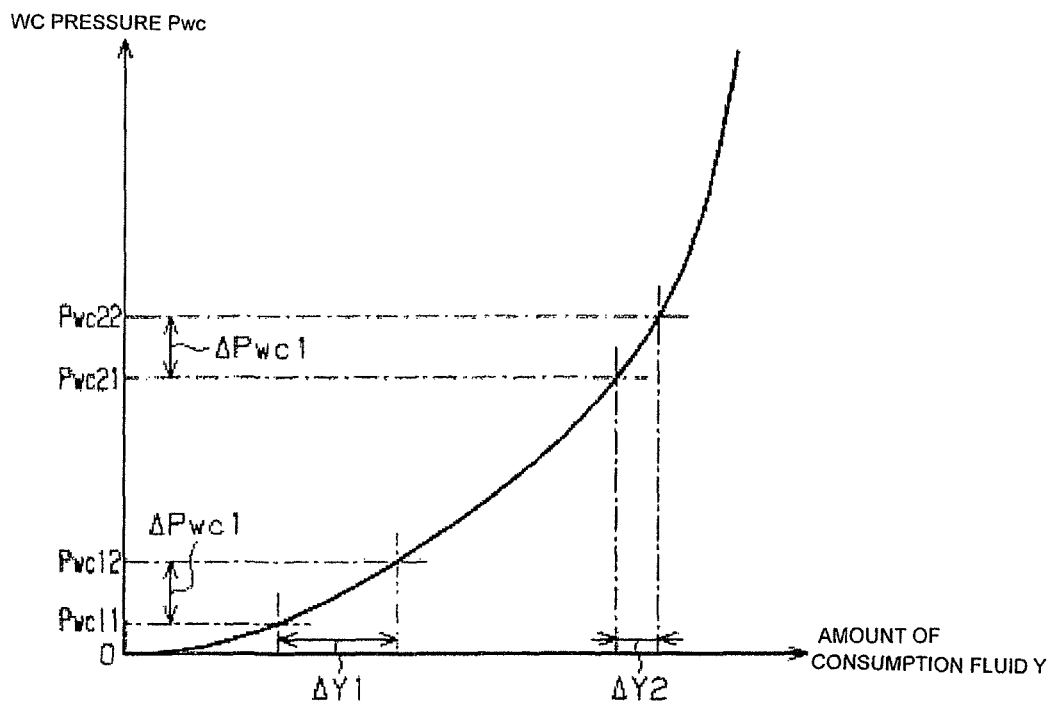

FIGS. 10A to 10D are timing charts when the braking operation is performed. FIG. 10A illustrates a transition of the target braking force, FIG. 10B illustrates a transition of the limit value of the regenerative braking force, FIG. 10C illustrates an aspect in which a ratio between the regenerative braking force and the hydraulic braking force changes, and FIG. 10D illustrates a transition of an actual amount of displacement of the brake pedal in the operating direction; and FIG. 11 is a graph illustrating a relation between the wheel cylinder pressure and an amount of consumption of brake fluid consumed to increase the wheel cylinder pressure.

DETAILED DESCRIPTION

Hereinafter, an embodiment of a vehicle braking control device will be described with reference to FIGS. 1 to 10. In the description herein, a traveling direction (an advancing direction) of a vehicle will be described as a front (a vehicle front).

Figure 1:
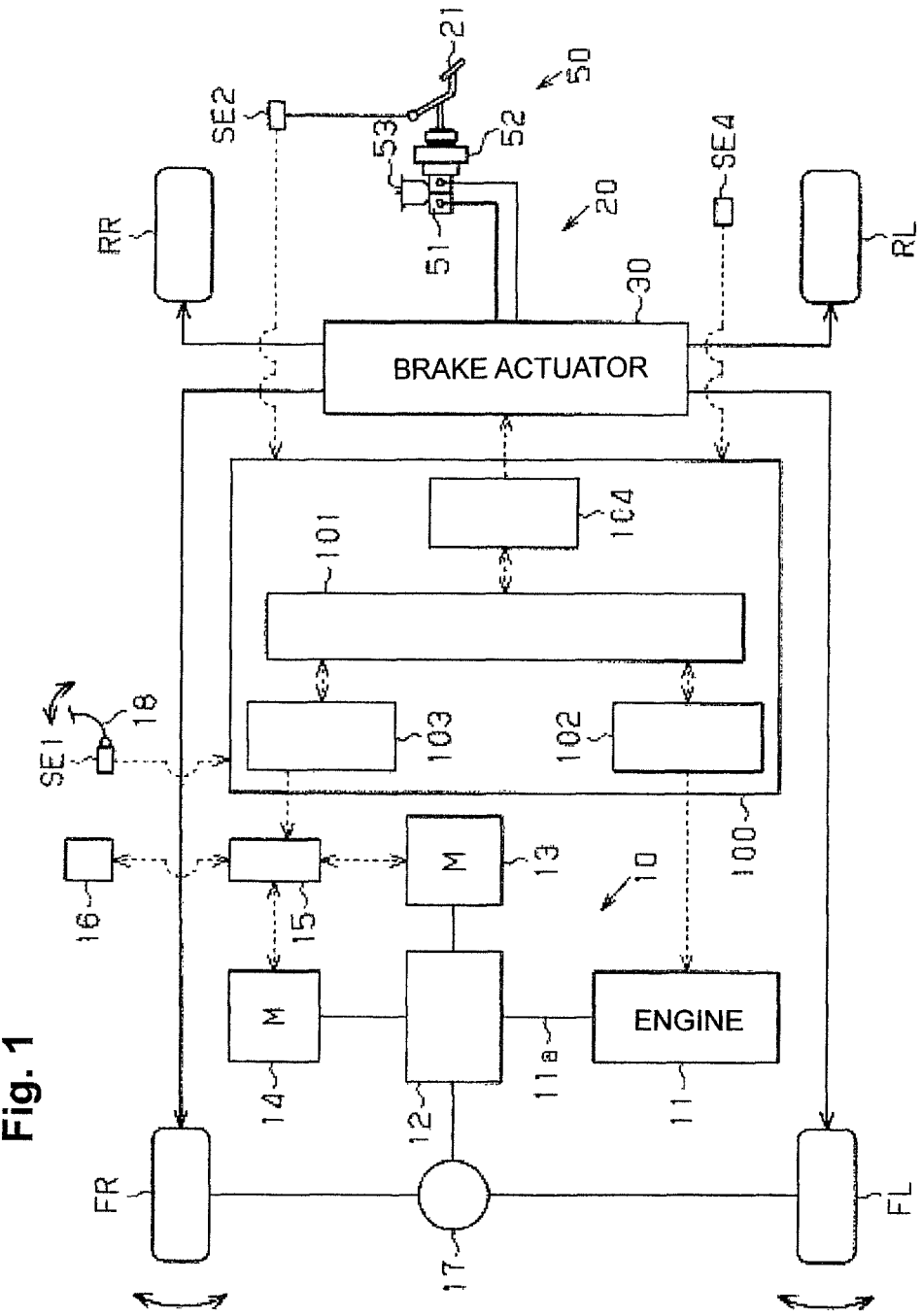
FIG. 1 is a block diagram illustrating a schematic configuration of a hybrid vehicle equipped with a control device according to an embodiment of a vehicle braking control device.

FIG. 1 illustrates a hybrid vehicle that is equipped with a control device 100 as a vehicle braking control device of this embodiment. As illustrated in FIG. 1, in addition to the control device 100, the hybrid vehicle is provided with a dual-motor type hybrid system 10, and a hydraulic braking device 20 that gives the braking force (hydraulic braking force) to all wheels FL, FR, RL, and RR.

The hybrid system 10 is equipped with an engine 11 operated by supply of fuel such as gasoline. A first motor 13 and a second motor 14 are connected to a crankshaft 11a of the engine 11 through a power transmission mechanism 12 having a planetary gear mechanism or the like. The power transmission mechanism 12 dividedly transmits the power from the engine 11 to the first motor 13 and FL and FR as the front drive wheels. Also, when driving the second motor 14, the power transmission mechanism 12 transmits the power from the second motor 14 to the front wheels FL and FR.

The first motor 13 generates electricity by the power transmitted via the power transmission mechanism 12. The electric power generated by the first motor 13 is supplied to a battery 16 via an inverter 15 and stored therein.

The second motor 14 functions as a drive source of the vehicle when a driver operates an accelerator pedal 18. At this time, the second motor 14 is supplied with the electric power from the battery 16 via the inverter 15. Then, the power generated by the second motor 14 is transmitted to the front wheels FL and FR via the power transmission mechanism 12 and a differential 17. In the vicinity of the accelerator pedal 18, an accelerator opening sensor SE1 is provided which outputs, to the control device 100, a signal depending on the amount of the accelerator operation as the amount of operation of the accelerator pedal 18.

Meanwhile, the power caused by the rotation of the front wheels FL and FR is transmitted to the second motor 14 through the differential 17 and the power transmission mechanism 12, during braking operation in which the driver operates a brake pedal 21 as a brake operating member. At this time, the second motor 14 acts as a generator, and the electric power generated by the second motor 14 is supplied to the battery 16 via the inverter 15 and stored therein. Moreover, the second motor 14 generating the electricity in this manner gives the vehicle the regenerative braking force depending on the amount of power generated by the second motor 14. Thus, the second motor 14 constitutes an example of the "regenerative braking device".

Next, the hydraulic braking device 20 will be described.

The hydraulic braking device 20 is equipped with a hydraulic supply device 50 to which the brake pedal 21 is drivingly connected, and a brake actuator 30 that is able to automatically adjust the hydraulic braking force with respect to the wheels FL, FR, RL, and RR. In addition, the hydraulic braking device 20 is provided with a braking operation amount sensor SE2 that outputs a signal depending on the amount of braking operation as an amount of operation of the brake pedal 21 to the control device 100.

Figure 2:
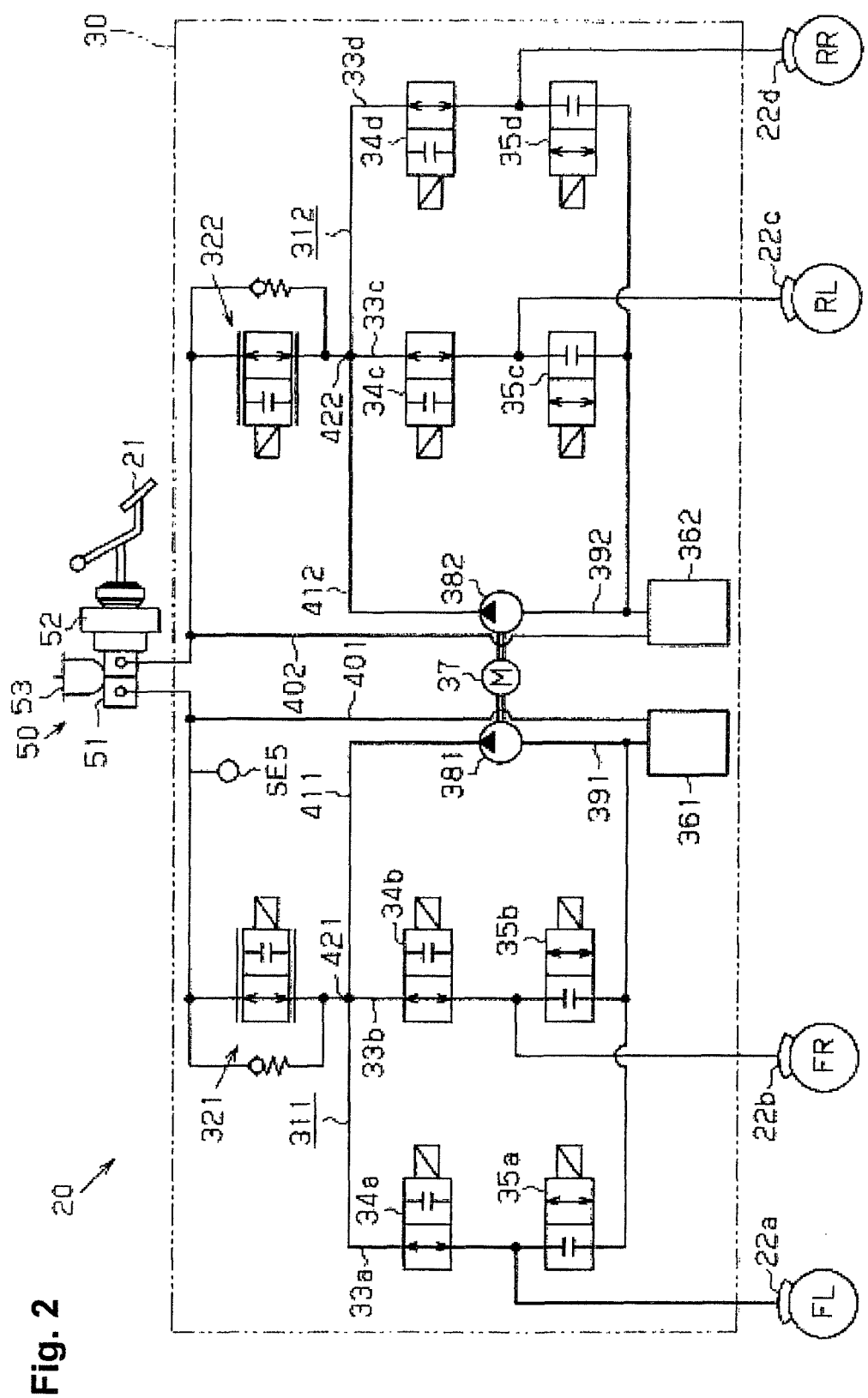
FIG. 2 is an enlarged cross-sectional view of a main schematic configuration illustrating a hydraulic braking device equipped in the hybrid vehicle of FIG. 1.

As illustrated in FIG. 2, the brake actuator 30 is provided with hydraulic circuits 311 and 312 of a dual system. A wheel cylinder 22a for a left front wheel and a wheel cylinder 22b for a right front wheel are connected to the first hydraulic circuit 311, and a wheel cylinder 22c for a left rear wheel and a wheel cylinder 22d for a right rear wheel are connected to the second hydraulic circuit 312. Moreover, when the brake fluid flows into the first and second hydraulic circuits 311 and 312 from the hydraulic supply device 50, the brake fluid flows into the wheel cylinders 22a to 22d, and the wheel cylinder pressure (hereinafter, also referred to as "WC pressure") as the hydraulic pressure in the wheel cylinders 22a to 22d increases. As a result, the hydraulic braking force depending on the WC pressure is applied to the wheels FL, FR, RL, and RR.

In a pathway which connects a master cylinder 51 of the hydraulic supply device 50 and the wheel cylinders 22a to 22d, differential pressure regulating valves 321 and 322 as linear solenoid valves are provided. In addition, a left front wheel pathway 33a and a right front wheel pathway 33b are provided on the wheel cylinders 22a and 22b side rather than the differential pressure regulating valve 321 in the first hydraulic circuit 311, and a left rear wheel pathway 33c and a right rear wheel pathway 33d are provided on the wheel cylinders 22c and 22d side rather than the differential pressure regulating valve 322 in the second hydraulic circuit 312. Moreover, in the pathways 33a to 33d, pressure increase valves 34a, 34b, 34c, and 34d as normally-open type solenoid valves that operate when regulating the pressure increase of the WC pressure in the wheel cylinders 22a to 22d, and pressure decrease valves 35a, 35b, 35c, and 35d as normally-close type solenoid valves which operate when decreasing the WC pressure are provided.

Furthermore, reservoirs 361 and 362 for temporarily storing the brake fluid which has flowed out through the pressure decrease valves 35a to 35d from the wheel cylinders 22a to 22d, and supply pumps 381 and 382, which are operated based on the rotation of the pump motor 37, are connected to the first and second hydraulic circuits 311 and 312. The reservoirs 361 and 362 are connected to the supply pumps 381 and 382 through sucking flow passages 391 and 392, and are connected to the passage of the master cylinder 51 side rather than the differential pressure regulating valves 321 and 322 through the master side flow passages 401 and 402. Furthermore, the supply pumps 381 and 382 are connected to connecting portions 421 and 422 between the differential pressure regulating valves 321 and 322 and the pressure increase valves 34a to 34d through the supply flow passages 411 and 412. Moreover, when the pump motor 37 is driven, the supply pumps 381 and 382 draw the brake fluid through the sucking flow passages 391 and 392 and the master side flow passages 401 and 402 from the interior of the reservoirs 361 and 362 and the master cylinder 51, and discharge the brake fluid into the supply flow passages 411 and 412. That is, by operation of the differential pressure regulating valves 321 and 322 and the supply pumps 381 and 382, a differential pressure is generated between the master cylinder 51 and the wheel cylinders 22a to 22d, and the hydraulic braking force according to the differential pressure is applied to the vehicle.

In addition to the master cylinder 51, the hydraulic supply device 50 is equipped with a booster device 52 that assists the braking operation force as the operating force of the brake pedal 21 applied by the driver and an atmospheric pressure reservoir 53 in which the brake fluid is stored. Here, as the booster device 52, a device connected to an intake manifold in which the negative pressure is generated during operation of the engine 11 is adopted. In the booster device 52, the differential pressure between the negative pressure generated in the intake manifold and the atmospheric pressure is used to assist the braking operation force applied by the driver.

Figure 3:
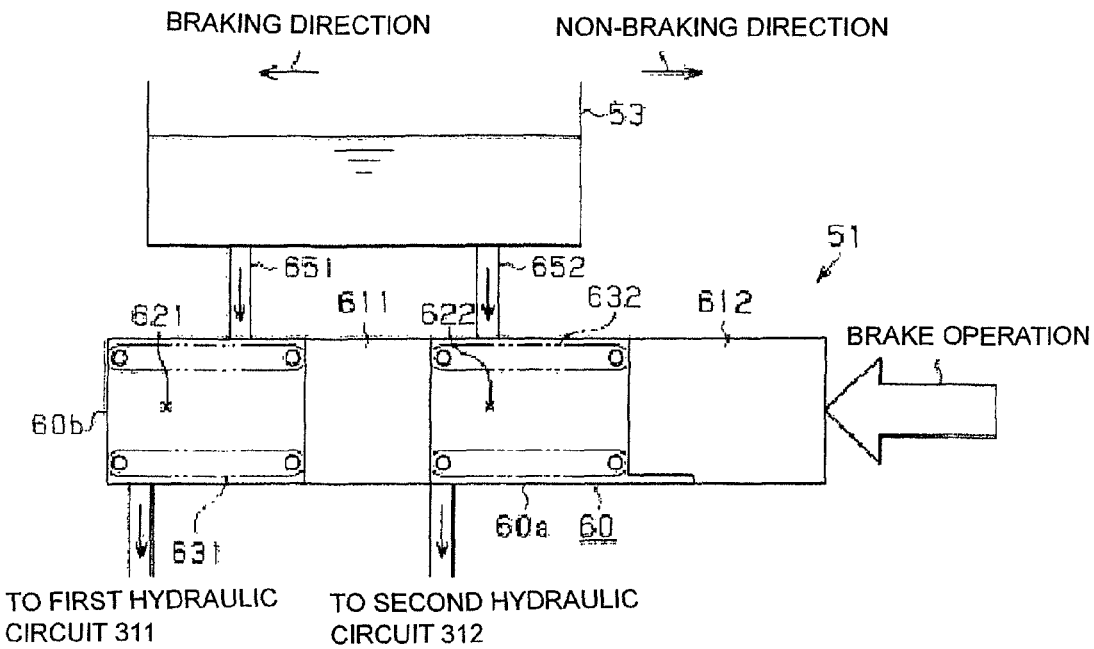
FIG. 3 is a schematic view illustrating a part of the hydraulic pressure supply device equipped in the hydraulic braking device of FIG. 2.

As illustrated in FIG. 3, in a housing 60 having a bottomed cylindrical shape forming the master cylinder 51, two master pistons 611 and 612 aligned in a horizontal direction in the drawing is provided. Each of the master pistons 611 and 612 is slidable axially (horizontal direction in FIG. 3) along an inner peripheral wall of a cylindrical portion 60a of the housing 60. That is, each of the master pistons 611 and 612 slides in the braking direction as the leftward direction in the drawing by the braking operation applied by the driver.

In addition, in a first master chamber 621 formed between a bottom wall 60b of the housing 60 and the first master piston 611, a first spring 631 is provided which applies the biasing force to the first master piston 611 in a non-braking direction (the rightward direction in the drawing) as an opposite direction of the braking direction. In addition, in a second master chamber 622 formed between the first master piston 611 and the second master piston 612, a second spring 632 is provided which biases the second master piston 612 in the non-braking direction.

Moreover, when the braking operation force acting on the first and second master pistons 611 and 612 increases, the first and second master pistons 611 and 612 slide in the braking direction against the biasing force from the first and second springs 631 and 632, and the volume of the first and second master chambers 621 and 622 becomes narrower. Meanwhile, when the braking operation force acting on the first and second master pistons 611 and 612 decreases, the first and second master pistons 611 and 612 slide in the non-braking direction by the biasing force from the first and second springs 631 and 632, and the volume of the first and second master chambers 621 and 622 becomes wider.

In addition, the interior of the first master chamber 621 communicates with the first hydraulic circuit 311 of the brake actuator 30, and communicates with the atmospheric pressure reservoir 53 through the first communication passage 651. In addition, the interior of the second master chamber 622 communicates with the second hydraulic circuit 312 of the brake actuator 30, and communicates with the atmospheric pressure reservoir 53 through the second communication passage 652.

Moreover, the communication between the first and second master chambers 621 and 622 and the first and second hydraulic circuits 311 and 312 is maintained even if an amount of braking operation BPInput is large or small. In contrast, the communication between the first and second master chambers 621 and 622 and the atmospheric pressure reservoir 53 is maintained when the amount of braking operation BPInput is less than a defined amount of operation BPInputTh, but the communication is blocked when the amount of braking operation BPInput is equal to or greater than the defined amount of operation BPInputTh.

Figure 4:
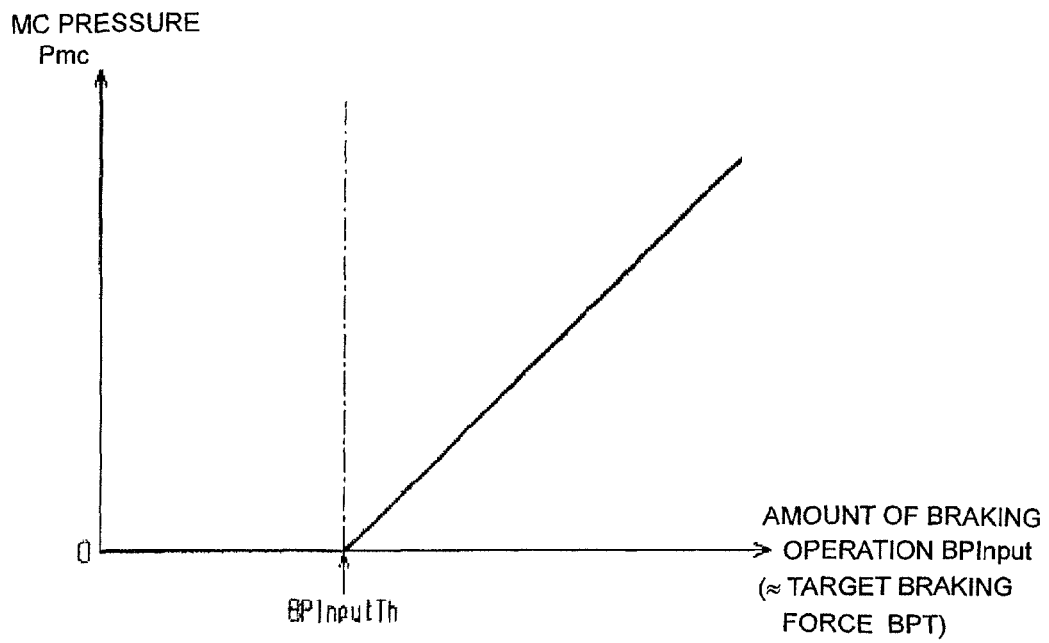
FIG. 4 is a graph illustrating a relation between an amount of braking operation (or a target braking force) and a master cylinder pressure of the master chamber.

Here, the master cylinder pressure (hereinafter, also referred to as "MC pressure") Pmc as a hydraulic pressure in the first and second master chambers 621 and 622 is a relative pressure based on the pressure (for example, atmospheric pressure) within the atmospheric pressure reservoir 53. Moreover, as illustrated in FIG. 4, when the amount of braking operation BPInput is less than the defined amount of operation BPInputTh, since the first and second master chambers 621 and 622 are in communication with the atmospheric pressure reservoir 53, the MC pressure Pmc of the first and second master chambers 621 and 622 becomes "0 (zero)". In this way, when the MC pressure Pmc is "0 (zero)", the brake fluid does not flow out to the first and second hydraulic circuits 311 and 312 from the interior of the first and second master chambers 621 and 622.

Meanwhile, when the amount of braking operation BPInput is equal to or greater than the defined amount of operation BPInputTh, since the communication between the first and second master chambers 621 and 622 and the atmospheric pressure reservoir 53 is blocked, as the amount of braking operation BPInput increases, the MC pressure Pmc gradually increases. That is, as the amount of braking operation BPInput increases, the amount of brake fluid flowing to the first and second hydraulic circuits 311 and 312 from the interior of the first second master chambers 621 and 622 increases, and the WC pressure of the wheel cylinders 22a to 22d rises.

Incidentally, the amount of braking operation BPInput substantially coincides with the target braking force BPT as the braking force required for the vehicle by the driver. Moreover, if the amount of braking operation BPInput is less than the defined amount of operation BPInputTh, the braking force (also referred to as "control braking force") controlled by the control device 100 is applied to the vehicle. In addition, this control braking force includes a regenerative braking force BPR from the second motor 14 as the regenerative braking device, and a hydraulic braking force BPP depending on the differential pressure between the master cylinder 51 and the wheel cylinders 22a to 22d generated by the operation of the brake actuator 30.

Next, the control device 100 will be described.

As illustrated in FIG. 1, in addition to an accelerator opening sensor SE1 and a braking operation amount sensor SE2, a vehicle speed sensor SE4 for detecting a vehicle speed VS of the vehicle, and a hydraulic pressure detecting sensor SE5 (see FIG. 2) configured to detect the MC pressure Pmc in the first and second master chambers 621 and 622 of the master cylinder 51 are electrically connected to the control device 100. Moreover, the control device 100 performs the overall control of the vehicle based on the detection signals from the various detection systems such as various sensors SE1, SE2, SE4, and E5.

Such a control device 100 is equipped with a power management computer 101, an engine control unit 102 configured to control the engine 11, a motor control unit 103 configured to control the respective first and second motors 13 and 14, and a brake control unit 104 configured to control the hydraulic braking device 20.

When the driver performs the accelerator operation, the power management computer 101 calculates the power required for the engine 11 and the power required for the second motor 14 on the basis of the traveling state of the vehicle. Moreover, the power management computer 101 individually transmits a control command based on the calculated required power to the engine control unit 102 and the motor control unit 103.

Furthermore, the power management computer 101 calculates the regenerative braking force applicable to the front wheels FL and FR at that time, based on the amount of electric storage of the battery 16 and the wheel speed of the front wheels FL and FR at that time. Then, the power management computer 101 transmits the calculated regenerative braking force at that time to the brake control unit 104.

Such a power management computer 101 receives information about an indicated value BPR_R2 (see FIG. 9) of the regenerative braking force calculated by the brake control unit 104 during the vehicle deceleration due to the braking operation of the driver. Then, the power management computer 101 transmits the received information to the motor control unit 103. Furthermore, the power management computer 101 receives, from the motor control unit 103, information about an actual regenerative braking force BPR_Real as the actual regenerative braking force applied to the vehicle by the second motor 14 at this time, and transmits the information to the brake control unit 104.

The motor control unit 103 receives information about the indicated value BPR_R2 of the regenerative braking force from the power management computer 101 during the vehicle deceleration due to the braking operation of the driver. Moreover, the motor control unit 103 causes the second motor 14 to generate the power so that the regenerative braking force equivalent to the indicated value BPR_R2 of the regenerative braking force based on the received information is applied to the front wheels FL and FR. Furthermore, the motor control unit 103 calculates the actual regenerative braking force BPR_Real as the actual regenerative braking force applied to the vehicle by the second motor 14, based on the amount of power generation from the second motor 14, and transmits the information about the actual regenerative braking force BPR_Real to the power management computer 101.

When the driver operates the brake, the brake control unit 104 calculates the amount of braking operation BPInput based on a signal from the braking operation amount sensor SE2, calculates the MC pressure Pmc based on a signal from the hydraulic pressure detecting sensor SE5, and calculates the target braking force BPT to the vehicle required by the driver. Moreover, the brake control unit 104 calculates the indicated value BPR_R2 of the regenerative braking force, based on the calculated target braking force BPT with respect to the vehicle and the regenerative braking force that can be applied to the front wheels FL and FR at that time, and transmits the information about the indicated value BPR_R2 to the power management computer 101.

At this time, when it is determined that the target braking force BPT to the vehicle can be met only by the regenerative braking force BPR, the brake control unit 104 does not actuate the brake actuator 30. That is, the brake control unit 104 does not give the hydraulic braking force BPP to the vehicle from the hydraulic braking device 20. On the other hand, when it is not possible to meet the target braking force BPT to the vehicle only by the regenerative braking force BPR, the brake control unit 104 gives the hydraulic braking force BPP to the vehicle. By controlling the regenerative braking force BPR and the hydraulic braking force BPP in this way, the recovery efficiency of the regenerative energy increases.

Next, an example of the cooperative control of the regenerative braking force BPR and the hydraulic braking force BPP during the vehicle braking due to the braking operation will be described with reference to the timing charts illustrated in FIGS. 5A to 5C.

Figure 5A:
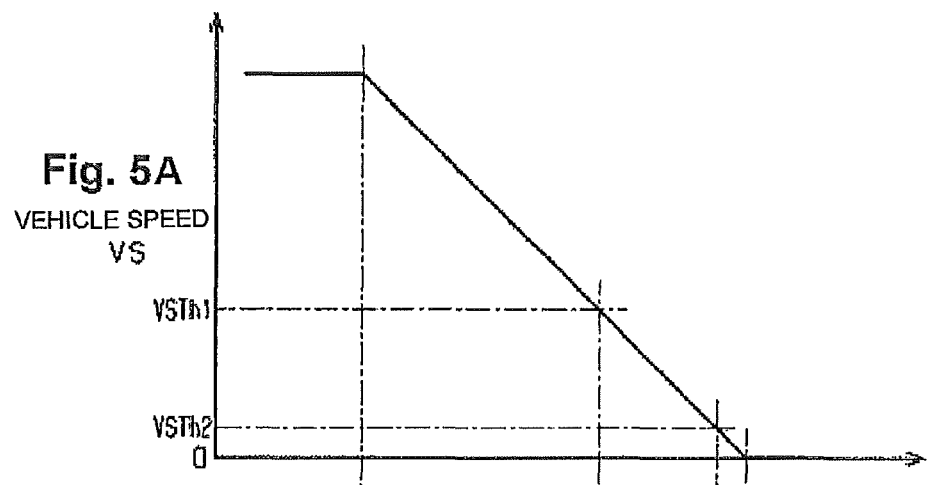
FIGS. 5A to 5C are timing charts when the braking operation is performed.
Figure 5B:
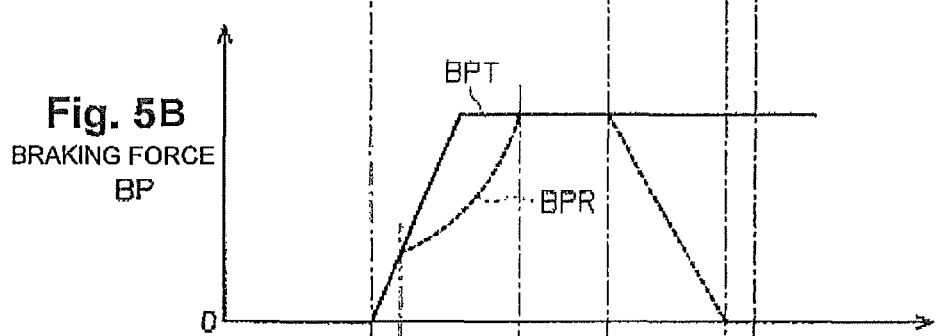
Figure 5C:
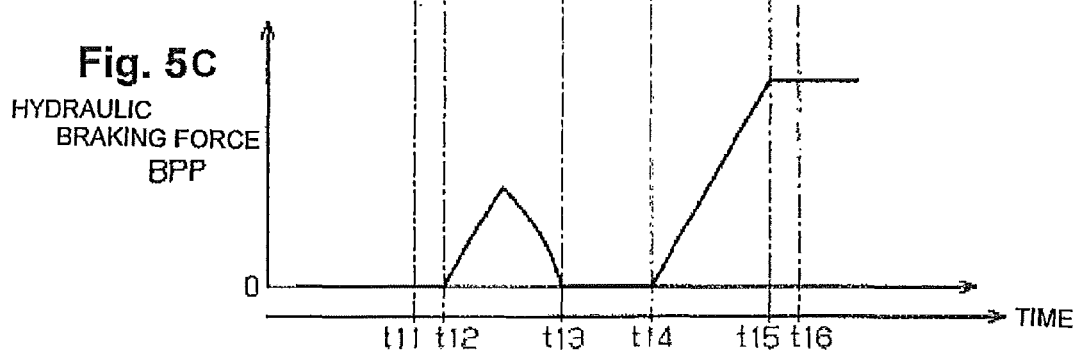

As illustrated in FIGS. 5A, 5B, and 5C, when the braking operation is started at a first timing t11, the target braking force BPT gradually increases in accordance with an increase in amount of braking operation BPInput. Moreover, immediately after the start of the braking operation, it is possible to meet the target braking force BPT by the regenerative braking force BPR. However, after a second timing t12, a deviation occurs between the target braking force BPT and the regenerative braking force BPR, by the response delay of the regenerative braking force BPR.

For that reason, after the second timing t12, the brake actuator 30 is actuated so that a difference obtained by subtracting the regenerative braking force BPR from the target braking force BPT becomes equal to the hydraulic braking force BPP. At this time, by operating the differential pressure regulating valves 321 and 322 and the supply pumps 381 and 382 forming the brake actuator 30, the differential pressure is generated between the master cylinder 51 and the wheel cylinders 22a to 22d. Then, the WC pressure in the wheel cylinders 22a to 22d increases and the hydraulic braking force BPP depending on the differential pressure is applied to the vehicle. Moreover, when reaching a third timing t13, since the target braking force BPT becomes equal to the regenerative braking force BPR, the operation of the brake actuator 30 is stopped and the hydraulic braking force BPP becomes "0 (zero)".

When the braking force BP is applied to the vehicle in this way, the vehicle speed VS of the vehicle gradually slows down. Moreover, when reaching a fourth timing t14, the vehicle speed VS becomes a start determination value VSTh1 as a switching start speed, and it is possible to determine that the vehicle speed VS becomes a low speed. For that reason, at the fourth timing t14, a switching control is started which gradually decreases the regenerative braking force BPR and gradually increases the hydraulic braking force BPP. At this time, since the differential pressure between the master cylinder 51 and the wheel cylinders 22a to 22d is gradually increased by the operation of the brake actuator 30, the hydraulic braking force BPP gradually increases. Then, at a fifth timing t15 before the vehicle stops, the vehicle speed VS reaches a termination determination value VSTh2 as a switching termination speed. Moreover, when the vehicle speed VS reaches the termination determination value VSTh2 in this way, the regenerative braking force BPR becomes "0 (zero)" by performing the switching control. For that reason, the switching control is terminated at the fifth timing t15. Thereafter, from the fifth timing t15 to a sixth timing t16 at which the vehicle stops, the hydraulic braking force BPP becomes equal to the target braking force BPT.

Thus, in the switching control, in order to gradually increase the hydraulic braking force BPP, the brake actuator 30 constituting the hydraulic braking device 20 is actuated. If the switching control is performed in a state in which the amount of braking operation BPInput is less than the defined amount of operation BPInputTh, the interior of the first and second master chambers 621 and 622 are in communication with the atmospheric pressure reservoir 53. For that reason, even if the hydraulic braking force BPP is increased by the operation of the brake actuator 30, the amount of brake fluid in the first and second master chambers 621 and 622 is hard to change.

That is, the operational reaction force acting on the brake pedal 21 is hardly changed by implementation of the switching control. The operational reaction force is a force that acts in an opposite direction to the braking operation force applied to the brake pedal 21 by the driver, and as the operational reaction force is small, the brake pedal 21 is easily displaced in the operating direction as the direction of increasing the MC pressure Pmc. However, when the amount of brake fluid in the first and second master chambers 621 and 622 hardly changes in this manner and the operational reaction force hardly changes, the first and second master pistons 611 and 612 do not slide in the braking direction. For that reason, the brake pedal 21, which is drivingly connected to the first and second master pistons 611 and 612, is not displaced in the operating direction.

Meanwhile, when the switching control is performed in a state in which the amount of braking operation BPInput is greater than the defined amount of operation BPInputTh, communication between the interior of the first and second master chambers 621 and 622 and the atmospheric pressure reservoir 53 is blocked. For that reason, when increasing the hydraulic braking force BPP by the operation of the brake actuator 30, the brake fluid in the first and second master chambers 621 and 622 decreases. At this time, in order to suppress the pressure decrease of the MC pressure Pmc in the first and second master chambers 621 and 622, the first and second master pistons 611 and 612 slide in the braking direction, the operational reaction force with respect to the brake pedal 21 decreases, and the brake pedal 21 is easily displaced in the operating direction. That is, when the braking operation force of the driver is substantially constant during implementation of the switching control, the brake pedal 21 is displaced in the operating direction.

When there is a large amount of displacement of the brake pedal 21 in the operating direction due to the implementation of the switching control, or the displacement speed is too fast, there is a fear of an increase in uncomfortable feeling imparted to the driver who operates the brake pedal 21 and a decline in drivability. Therefore, during the braking operation, for each predetermined control cycle, it is preferred to predict an amount of decrease in operational reaction force with respect to the brake pedal 21 that occurs between the start time and the end time of the switching control, and it is preferred to reduce a limit value BPR_Lim of the regenerative braking force, as a predicted value of the amount of decrease in operational reaction force is large. When decreasing the limit value BPR_Lim in this manner, the regenerative braking force BPR when the switching control is actually started is likely to be small as compared to a case of not changing the limit value BPR_Lim depending on the predicted value. Moreover, when performing the switching control in the state in which the regenerative braking force BPR is small, the amount of increase in hydraulic braking force BPP according to the implementation of the control decreases, the amount of decrease in the brake fluid from the interior of the first and second master chambers 621 and 622 decreases, and the decrease speed of the brake fluid slows down. As a result, the amount of decrease in the operational reaction force with respect to the brake pedal 21 decreases when the switching control is actually performed, and the decrease speed of the operational reaction force slows down. Therefore, in a case where the braking operation force of the driver when the switching control is actually performed is substantially constant, the amount of displacement of the brake pedal 21 in the operating direction during the switching control decreases, the displacement speed slows down, and thus, a decline in drivability is suppressed.

Here, an example of a method of predicting the amount of decrease in the operational reaction force with respect to the brake pedal 21 in the case of performing the switching control will be described with reference to FIGS. 3 and 6.

As illustrated in FIG. 3, as the amount of braking operation of the driver BPInput is large and the MC pressure Pmc is high, the volume of the first and second master chambers 621 and 622 becomes narrower. For that reason, when reducing a certain amount of brake fluid from the first and second master chambers 621 and 622, as the MC pressure Pmc at the start of decrease of the brake fluid is high, the sliding amount of the first and second master pistons 611 and 612 in the braking direction increases. Moreover, it is possible to predict that, as the sliding amount of the first and second master pistons 611 and 612 in the braking direction is large, the amount of decrease in the operational reaction force with respect to the brake pedal 21 increases, that is, the amount of displacement of the brake pedal 21 in the operating direction easily increases. It should be noted that the predicted value of the amount of decrease in operational reaction force with respect to the brake pedal 21 due to the implementation of the switching control is also referred to as "operational reaction force decrease predicted value $\Delta BP$".

Figure 6:
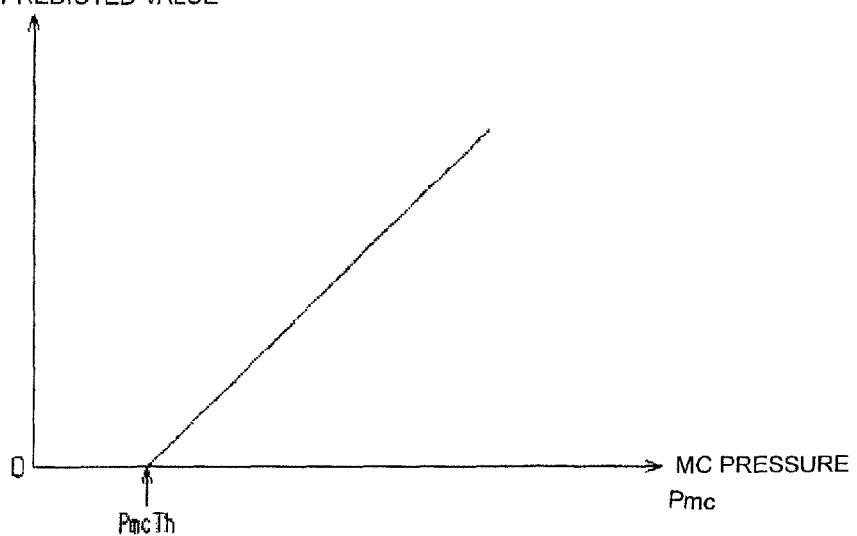
FIG. 6 is a graph illustrating a relation between the master cylinder pressure and an amount of displacement of the pedal.

That is, as illustrated in FIG. 6, as the MC pressure Pmc at this time is high, the operational reaction force decrease predicted value $\Delta BP$ increases. However, when the MC pressure Pmc is less than the defined MC pressure PmcTh, the operational reaction force decrease predicted value $\Delta BP$ becomes "0 (zero)." The reason is that, when the sliding amount of the first and second master pistons 611 and 612 is small, by friction or the like that occurs when displacing the brake pedal 21, the operational reaction force with respect to the brake pedal 21 hardly decreases. Moreover, if MC pressure Pmc is equal to or greater than the defined MC pressure PmcTh, as the MC pressure Pmc is high, the operational reaction force decrease predicted value $\Delta BP$ increases.

Next, a map for determining the limit value BPR_Lim of the regenerative braking force will be described referring to FIG. 7.

Figure 7:
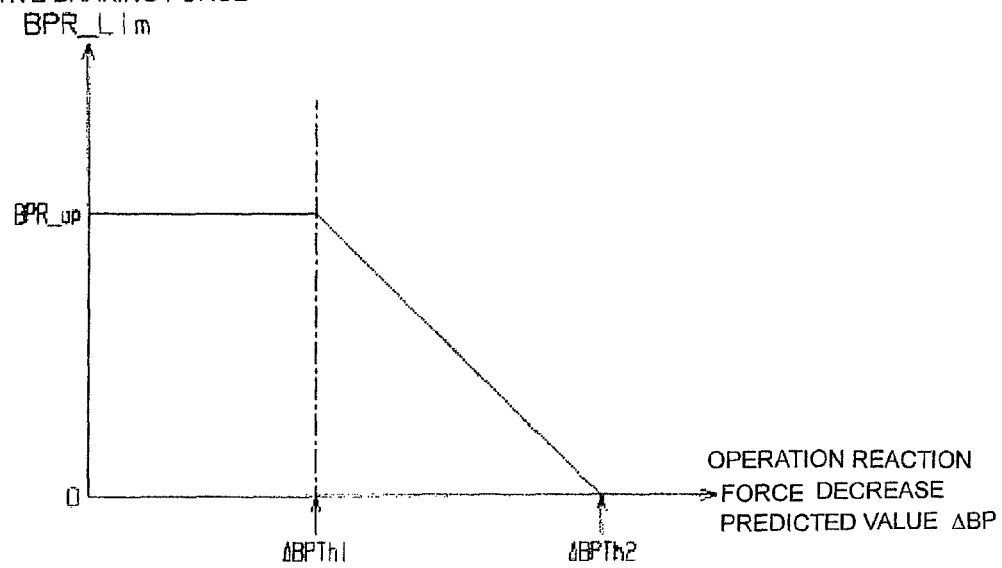
FIG. 7 is a map for determining a limit value of the regenerative braking force based on an operational reaction force decrease predicted value.

The map illustrated in FIG. 7 is a map illustrating a relation between the operational reaction force decrease predicted value $\Delta BP$ and the limit value BPR_Lim of the regenerative braking force. As illustrated in FIG. 7, when the operational reaction force decrease predicted value $\Delta BP$ is less than the defined amount of decrease $\Delta BPTh1$, the limit value BPR_Lim of the regenerative braking force becomes a limit value BPR_up of the regenerative braking force that can be applied to the vehicle by the second motor 14 as a regenerative braking device. The limit value BPR_up is a value determined by the performance or the like of the second motor 14, regardless of the amount of electric storage of the battery 16 and the traveling state of the vehicle at that time. That is, when the operational reaction force decrease predicted value $\Delta BP$ is less than the defined amount of decrease $\Delta BPTh1$, it is also possible to exclude a limit value of the regenerative braking force. Furthermore, the defined amount of decrease $\Delta BPTh1$ corresponds to "determination value" for determining whether the operational reaction force decrease predicted value $\Delta BP$ is large or small.

On the other hand, when the operational reaction force decrease predicted value $\Delta BP$ is equal to or greater than the defined amount of decrease $\Delta BPTh1$, as the operational reaction force decrease predicted value $\Delta BP$ is large, the limit value BPR_Lim of the regenerative braking force decreases. Moreover, in a case where $\Delta BP$ is equal to or greater than an amount of regeneration prohibition determination $\Delta BPTh2$, the limit value BPR_Lim of the regenerative braking force becomes "0 (zero)."

Next, a processing routine executed by the brake control unit 104 of the control device 100 so as to adjust the regenerative braking force BPR and the hydraulic braking force BPP during the braking operation will be described with reference to the flowchart illustrated in FIG. 8. It should be noted that the present processing routine is a processing routine that is executed for each control cycle.

Figure 8:
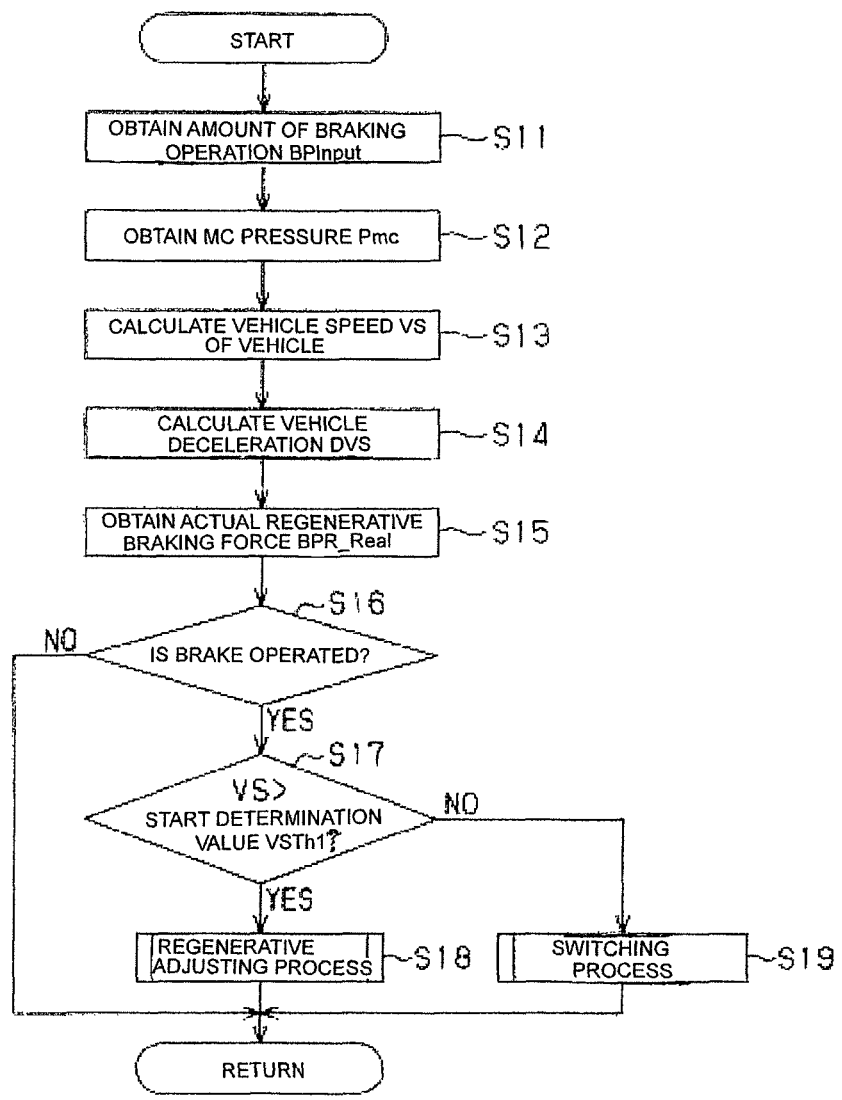
FIG. 8 is a flowchart illustrating a processing routine executed to adjust the regenerative braking force and the hydraulic braking force during the braking operation.

As illustrated in FIG. 8, in this processing routine, the brake control unit 104 obtains the amount of braking operation BPInput detected by the braking operation amount sensor SE2 (step S11), and obtains the MC pressure Pmc detected by the hydraulic pressure detecting sensor SE5 (step S12). Subsequently, the brake control unit 104 obtains a vehicle speed VS of the vehicle detected by the vehicle speed sensor SE4 (step S13), and obtains a vehicle deceleration DVS by time-differentiating the obtained vehicle speed VS (step S14). The vehicle deceleration DVS becomes a negative value during acceleration of the vehicle, and becomes a positive value during deceleration of the vehicle. Moreover, the brake control unit 104 obtains the actual regenerative braking force BPR_Real as the regenerative braking force applied to the vehicle at this time, from the power management computer 101 (step S15).

Next, the brake control unit 104 determines whether the driver is in the course of performing the braking operation (step S16). If the driver is not in the course of braking operation (NO in step S16), the brake control unit 104 temporarily terminates the processing routine. On the other hand, if the driver is in the course of braking operation (YES in step S16), it is determined whether the vehicle speed VS obtained in step S13 is greater than the start determination value VSTh1 (see FIGS. 5A to 5C) (step S17). If the vehicle speed VS is greater than the start determination value VSTh1 (YES in step S17), the brake control unit 104 executes a regeneration adjusting process described below (step S18) and temporarily terminates the processing routine. On the other hand, if the vehicle speed VS is equal to or less than the start determination value VSTh1 (NO in step S17), the brake control unit 104 executes a switching process described below (step S19) and temporarily terminates the processing routine.

Next, the switching process (switching process routine) of the step S19 will be described. In the switching process routine, the brake control unit 104 calculates the decrease speed of the regenerative braking force BPR and the increase speed of the hydraulic braking force BPP, based on the vehicle deceleration DVS at the time when the vehicle speed VS reaches the start determination value VSTh1, and the actual regenerative braking force BPR_Real at that time. That is, as the vehicle deceleration DVS at the time when the vehicle speed VS reaches the start determination value VSTh1 is large, the decrease speed of the regenerative braking force BPR and the increase speed of the hydraulic braking force BPP are determined to large values. In addition, as the actual regenerative braking force BPR_Real at that time is large, the decrease speed of the regenerative braking force BPR and the increase speed of the hydraulic braking force BPP are determined to large values.

Moreover, the brake control unit 104 transmits information of reducing the actual regenerative braking force BPR_Real at the determined decrease speed to the power management computer 101. Then, the power management computer 101 transmits the information received from the brake control unit 104 to the motor control unit 103. Moreover, the motor control unit 103, which has received the information, controls the power generation mode of the second motor 14 so that the actual regenerative braking force BPR_Real decreases at the decrease speed according to the information.

Furthermore, the brake control unit 104 controls the brake actuator 30 to increase the hydraulic braking force BPP at the determined increase speed. At this time, for example, after setting the operating speed of the supply pumps 381 and 382 to be constant, as the determined increase speed is fast, the brake control unit 104 increases the operating speed of the differential pressure regulating valves 321 and 322.

Moreover, when the actual regenerative braking force BPR_Real acquired in the step S15 becomes "0 (zero)", since switching to the hydraulic braking force BPP from the regenerative braking force BPR is completed, the brake control unit 104 terminates an increase in the hydraulic braking force BPP caused by the operation of the brake actuator 30. That is, the switching control is terminated. After the termination of the switching control, the brake control unit 104 controls the brake actuator 30 so that hydraulic braking force BPP matches the target braking force BPT.

Next, the regeneration adjusting process routine of step S18 will be described with reference to the flowchart illustrated in FIG. 9.

Figure 9:
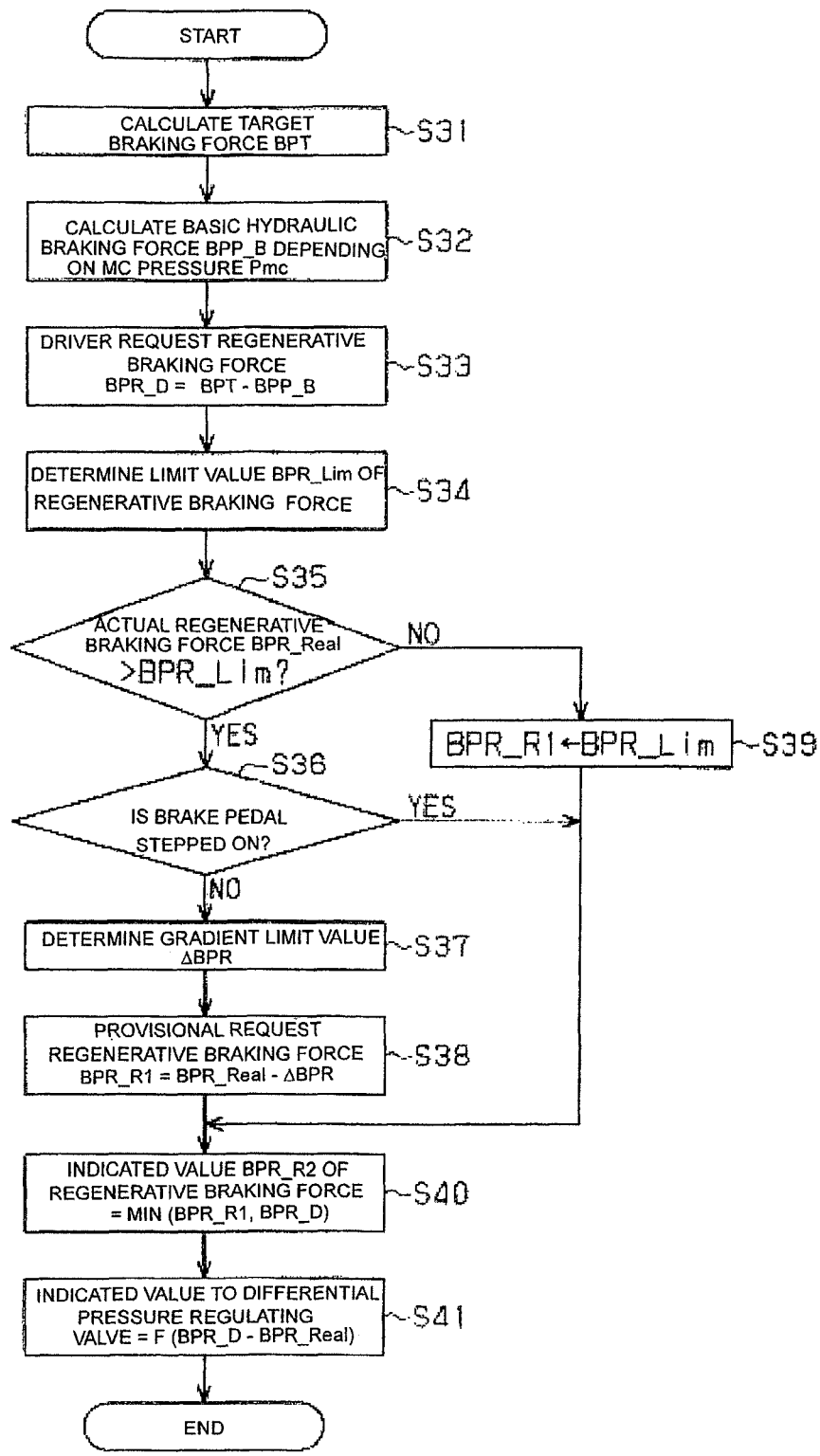
FIG. 9 is a flowchart illustrating a processing routine for executing the regeneration adjusting process.

As illustrated in FIG. 9, in this processing routine, the brake control unit 104 calculates the target braking force BPT, based on the amount of braking operation BPInput and the MC pressure Pmc obtained in the above-described steps S11 and S12 (step S31).

Here, if the MC pressure Pmc is "0 (zero)", the interior of the first and second master chambers 621 and 622 are in communication with the atmospheric pressure reservoir 53. For that reason, even in a case where the supply pumps 381 and 382 pump up the brake fluid from the interior of the first and second master chambers 621 and 622 so as to generate a differential pressure between the master cylinder 51 and the wheel cylinders 22a to 22d, the amount of brake fluid in the first and second master chambers 621 and 622 does not decrease. Thus, it is possible to consider that the amount of braking operation BPInput detected by the braking operation amount sensor SE2 substantially coincides with the actual amount of braking operation of the driver. Therefore, the brake control unit 104 sets the target braking force BPT as an operation amount equivalent value that is a value depending on the amount of braking operation BPInput.

Meanwhile, if the MC pressure Pmc is greater than "0 (zero)", communication between first and second master chambers 621 and 622 and the atmospheric pressure reservoir 53 is blocked. Even in this case, when a differential pressure is not generated between the master cylinder 51 and the wheel cylinders 22a to 22d by operation of the brake actuator 30, it is possible to consider that the amount of braking operation BPInput detected by braking operation amount sensor SE2 substantially coincides with the actual amount of braking operation of the driver. For that reason, the brake control unit 104 sets the target braking force BPT to the operation amount equivalent value depending on the amount of braking operation BPInput.

However, in a state in which the MC pressure Pmc is greater than "0 (zero)", if a differential pressure is generated between the master cylinder 51 and the wheel cylinders 22a to 22d by operation of the brake actuator 30, the amount of brake fluid in the first and second master chambers 621 and 622 decreases by the operation of the brake actuator 30. In this case, there is a possibility that the first and second master pistons 611 and 612 slide in the braking direction due to a decrease in the brake fluid from the first and second master chambers 621 and 622, the operational reaction force acting on the brake pedal 21 decreases, and the brake pedal 21 is displaced in the operating direction. That is, the amount of braking operation BPInput detected by the braking operation amount sensor SE2 includes a displacement of brake pedal 21 in the operating direction, which is not intended by the driver, and becomes greater than the actual amount of braking operation of the driver. In addition, it is possible to predict that, as the MC pressure Pmc is high, the amount of displacement of the brake pedal 21 in the operating direction is great.

Therefore, the brake control unit 104 corrects the operation amount equivalent value depending on the amount of braking operation BPInput by the MC pressure Pmc, and sets a value after correction to the target braking force BPT. For example, the brake control unit 104 calculates a correction value that increases as the MC pressure Pmc is high, and sets a difference, which is obtained by subtracting the correction value from the operation amount equivalent value depending on the amount of braking operation BPInput, to the target braking force BPT.

After calculating the target braking force BPT in this way, the brake control unit 104 calculates a basic hydraulic braking force BPP_B as a hydraulic braking force corresponding to the obtained MC pressure Pmc (step S32). When the MC pressure Pmc is "0 (zero)", the basic hydraulic braking force BPP_B becomes "0 (zero)", and as the MC pressure Pmc is high, the basic hydraulic braking force increases. Next, the brake control unit 104 sets a difference, which is obtained by subtracting the basic hydraulic braking force BPP_B calculated in step S32 from the target braking force BPT calculated in step S31, to a driver request regenerative braking force BPR_D (step S33). Moreover, the brake control unit 104 determines the limit value BPR_Lim of the regenerative braking force to a value depending on the target braking force BPT calculated in step S31 (step S34).

Here, as the amount of braking operation BPInput is large, the target braking force BPT becomes a larger value. In addition, as the amount of braking operation BPInput is large, the MC pressure Pmc becomes high. For that reason, it is possible to estimate that, as the MC pressure Pmc is high, the target braking force BPT is great. For that reason, when the switching control is assumed to start at this timing, it is possible to estimate that, as the target braking force BPT at this time is high, the operational reaction force decrease predicted value ΔBP increases. That is, the target braking force BPT is an example of a "correlation value" that correlates to the amount of decrease in the operational reaction force with respect to the brake pedal 21 from the start to the end of the switching control. Therefore, the brake control unit 104 functions as a "correlation value output unit" that outputs the correlation value correlating to the amount of decrease in the operational reaction force during the braking operation, before the start of the switching control.

Moreover, the brake control unit 104 determines the limit value BPR_Lim of the regenerative braking force, using the map illustrated in FIG. 7. At this time, the operational reaction force decrease predicted value ΔBP of a horizontal axis in FIG. 7 may be replaced with the target braking force BPT to determine the limit value BPR_Lim. In this case, when the target braking force BPT is less than a defined decrease amount correlation value BPT_Th1 as a value corresponding to the defined amount of decrease ΔBPTh1 (see FIG. 7), the limit value BPR_Lim of the regenerative braking force becomes a limit value BPR_up. That is, when assuming the target braking force BPT as the correlation value that correlates to the amount of decrease in the operational reaction force, the defined decrease amount correlation value BPT_Th1 functions as a "determination value" for determining whether the operational reaction force decrease predicted value ΔBP is great or small.

Furthermore, when the target braking force BPT is equal to or greater than a regenerative inhibition determination amount correlation value BPT_Th2 that is a value corresponding to the amount of regenerative inhibition determination ΔBPTh2 (see FIG. 7), the limit value BPR_Lim of the regenerative braking force becomes "0 (zero)". Moreover, when the target braking force BPT is equal to or greater than the defined decrease amount correlation value BPT_Th1 and is less than the regenerative inhibition determination amount correlation value BPT_Th2, as the target braking force BPT decreases, the limit value BPR_Lim of the regenerative braking force gradually decreases. Therefore, the brake control unit 104, which determines the limit value BPR_Lim of the regenerative braking force in this manner, also functions as "limit value determination unit" that reduces the limit value BPR_Lim of the regenerative braking force, as the target braking force BPT as an example of the correlation value increases.

Subsequently, the brake control unit 104 determines whether the actual regenerative braking force BPR_Real obtained in the above-described step S15 is greater than the limit value BPR_Lim of the regenerative braking force determined in step S34 (step S35). If the actual regenerative braking force BPR_Real is greater than the limit value BPR_Lim (YES in step S35), the brake control unit 104 determines whether the brake pedal 21 is in the course of being further stepped on by the driver (step S36).

Here, in a case where the brake actuator 30 is not operated, when the amount of braking operation BPInput detected by the braking operation amount sensor SE2 increases, it is possible to determine that the brake pedal 21 is further stepped on. Meanwhile, if the brake fluid decreases from the interior of the first and second master chambers 621 and 622 by operation of the brake actuator 30, when the increase speed of the amount of braking operation BPInput is higher than the displacement speed of the brake pedal 21 in the operating direction due to a decrease in the brake fluid, it is possible to determine that the brake pedal 21 is further stepped on. In addition, the displacement speed of the brake pedal 21 in the operating direction due to a decrease in the brake fluid from the interior of the first and second master chambers 621 and 622 may be a predetermined value that is set in advance, and may be a value depending on the decrease speed of the brake fluid in the first and second master chambers 621 and 622 due to the operation of the brake actuator 30.

If the brake pedal 21 is not in the course of being further stepped on (NO in step S36), as the target braking force BPT calculated in step S31 is large, the brake control unit 104 determines a gradient limit value ΔBPR to a smaller value (step S37). Moreover, the brake control unit 104 sets a difference, which is obtained by subtracting the gradient limit value ΔBPR determined in step S37 from the actual regenerative braking force BPR_Real obtained in the above-described step S15, to a provisional request regenerative braking force BPR_R1 (step S38). That is, the target braking force BPT is greater than the defined decrease amount correlation value BPT_Th1 functioning as a determination value, the actual regenerative braking force BPR_Real is greater than the limit value BPR_Lim at this time, and when the brake pedal 21 is not further stepped on, as the target braking force BPT is large, the provisional request regenerative braking force BPR_R1 gradually decreases. Moreover, the process of the brake control unit 104 proceeds to step S40 described below.

Meanwhile, if the brake pedal 21 is in the course of being further stepped on (YES in step S36), the process of the brake control unit 104 proceeds to step S40 described below, without performing the processes of steps S37 and S38. That is, even in a state in which the target braking force BPT is greater than the defined decrease amount correlation value BPT_Th1 functioning as a determination value, and the actual regenerative braking force BPR_Real is greater than the limit value BPR_Lim at this time, if the brake pedal 21 is in the course of being further stepped on, the provisional request regenerative braking force BPR_R1 is held at the value at the preceding control cycle.

Meanwhile, if the actual regenerative braking force BPR_Real is equal to or less than the limit value BPR_Lim of the regenerative braking force (NO in step S35), the brake control unit 104 substitutes the limit value BPR_Lim at this time into the provisional request regenerative braking force BPR_R1 (step S39). Moreover, the process of the brake control unit 104 proceeds to the next step S40.

In step S40, the brake control unit 104 compares the provisional request regenerative braking force BPR_R1 obtained in step S38 or step S39 with a driver request regenerative braking force BPR_D calculated in step S33, and sets the smaller value to an indicated value BPR_R2 of the regenerative braking force. That is, if the actual regenerative braking force BPR_Real is equal to or less than the limit value BPR_Lim of the regenerative braking force (NO in step S35), the indicated value BPR_R2 of the regenerative braking force does not exceed the limit value BPR_Lim of the regenerative braking force. Meanwhile, if the actual regenerative braking force BPR_Real is greater than the limit value BPR_Lim of the regenerative braking force (YES in step S35), when a condition in which the brake pedal 21 is not further stepped on is satisfied (YES in step S36), the indicated value BPR_R2 of the regenerative braking force gradually declines.

In addition, information about the indicated value BPR_R2 of the regenerative braking force determined in this way is transmitted to the power management computer 101. Moreover, the information is transmitted to the motor control unit 103 from the power management computer 101. Then, the motor control unit 103 controls the second motor 14 so that the actual regenerative braking force BPR_Real becomes equal to the indicated value BPR_R2 of the regenerative braking force.

Moreover, the brake control unit 104 obtains a difference obtained by subtracting the actual regenerative braking force BPR_Real obtained at the above step S15 from the driver request regenerative braking force BPR_D calculated in step S33, and calculates the indicated value of the differential pressure regulating valves 321 and 322 based on the difference (step S41). At this time, if the driver request regenerative braking force BPR_D is greater than the actual regenerative braking force BPR_Real, the indicated values with respect to the differential pressure regulating valves 321 and 322 are greater than the values obtained at the preceding control cycle. Meanwhile, if the driver request regenerative braking force BPR_D is smaller than the actual regenerative braking force BPR_Real, the indicated values of the differential pressure regulating valves 321 and 322 are smaller than the values obtained at the preceding control cycle. Moreover, as the indicated value obtained is large, the brake control unit 104 increases the value of the current flowing through the differential pressure regulating valves 321 and 322 and decreases the degree of opening of the differential pressure regulating valves 321 and 322. That is, as the indicated value is large, the differential pressure between the master cylinder 51 and the wheel cylinders 22*a* to 22*d* increases. Therefore, an example of a "control unit" is constituted by the brake control unit 104 that controls the brake actuator 30, and the motor control unit 103 that controls the second motor 14 as a regenerative braking device. Thereafter, the brake control unit 104 terminates the processing routine.

Next, the operation at the time when the vehicle stops by the braking operation of the driver will be described with reference to the timing charts illustrated in FIGS. 10A to 10D. Here, for convenience of explanation and understanding of the specification, it is assumed that a response delay does not occur in an increase in regenerative braking force BPR with respect to an increase in the target braking force BPT. Furthermore, after the third timing t23, the braking operation force of the driver is assumed to be constant.

As illustrated in FIGS. 10A, 10B, 10C, and 10D, when the driver starts the braking operation at the first timing t21 during the vehicle traveling, the target braking force BPT increases with an increase in the amount of braking operation BPInput. In the initial stage in which the braking operation is started in this way, since the amount of braking operation BPInput is not so large and the target braking force BPT is less than the defined decrease amount correlation value BPT_Th1, the limit value BPR_Lim of the regenerative braking force becomes the limit value BPR_up (step S34). Furthermore, since the MC pressure Pmc is "0 (zero)", the basic hydraulic braking force BPP_B becomes "0 (zero)", and the driver request regenerative braking force BPR_D becomes equal to the target braking force BPT (steps S32 and S33). That is, as the target braking force BPT increases, the driver request regenerative braking force BPR_D gradually increases. Furthermore, in this state, since the regenerative braking force BPR (that is, the actual regenerative braking force BPR_Real) applied to the vehicle by the second motor 14 is smaller than the limit value BPR_Lim at that time (=BPR_up) (NO in Step S35), it gradually increases in conjunction with an increase in the target braking force BPT (step S40).

Moreover, at the second timing t22 in which the amount of braking operation BPInput is increasing, the target braking force BPT reaches the defined decrease amount correlation value BPT_Th1. Then, after the second timing t22, as the target braking force BPT increases, the limit value BPR_Lim of the regenerative braking force gradually decreases (step S34). In addition, after the third timing t23, since the braking operation force of the driver does not change, the target braking force BPT becomes constant. For that reason, after the third timing t23, the limit value BPR_Lim of the regenerative braking force is held at the value of the third timing t23.

Here, basically, a regenerative decrease control is carried out prior to the switching control (steps S37, S38, and S39). The regenerative decrease control decreases the regenerative braking force BPR to the limit value BPR_Lim, and increases the hydraulic braking force BPP so as to compensate a decrease in the regenerative braking force BPR, when the regenerative braking force BPR exceeds the limit value BPR_Lim.

However, during the period from the second timing t22 to the third timing t23, the amount of braking operation BPInput increases. That is, during the period, all the following conditions are satisfied. That is, the target braking force BPT is greater than the defined decrease amount correlation value BPT_Th1, the regenerative braking force BPR applied to the vehicle by the second motor 14 is greater than the limit value BPR_Lim at this time (YES in step S35), and the amount of braking operation BPInput increases (YES in step S36). For that reason, during the period, even if the limit value BPR_Lim of the regenerative braking force gradually decreases in accordance with an increase in the target braking force BPT, the regenerative braking force BPR applied to the vehicle by the second motor 14 is held at the value of the second timing t22 (step S40). That is, during the period, since the regenerative braking force BPR (that is, the actual regenerative braking force BPR_Real) is equal to the driver request regenerative braking force BPR_D (in this case, the limit value BPR_Lim of the regenerative braking force at the present time), the indicated value of the differential pressure regulating valves 321 and 322 becomes "0 (zero)" (step S41). That is, there is no possibility that the amount of brake fluid in the first and second master chambers 621 and 622 decreases by operation of the brake actuator 30.

In this case, at the second timing t22, communication between the first and second master chambers 621 and 622 and the atmospheric pressure reservoir 53 is blocked. For that reason, during the period from the second timing t22 to the third timing t23, the MC pressure Pmc gradually increases by the braking operation of the driver, the brake fluid of an amount corresponding to the increase in the MC pressure Pmc is supplied into the wheel cylinders 22a to 22d through a pathway in which the differential pressure regulating valves 321 and 322 are arranged, and the WC pressure is increased. Thus, the hydraulic braking force BPP, more specifically, the basic hydraulic braking force BPP_B as a braking force corresponding to a pressure increase amount of the MC pressure Pmc gradually increases.

Moreover, after the third timing t23, the amount of braking operation BPInput is maintained, and the target braking force BPT is held at the value of the third timing t23. That is, all the following conditions are satisfied. The target braking force BPT is greater than the defined decrease amount correlation value BPT_Th1, the regenerative braking force BPR applied to the vehicle by the second motor 14 is greater than the limit value BPR_Lim at the present time (YES in step S35), and the amount of braking operation BPInput does not increase (NO in step S36). For that reason, the regenerative decrease control of decreasing the regenerative braking force BPR and increasing the hydraulic braking force BPP is carried out prior to the switching control (steps S37, S38, S40, and S41). At this time, the regenerative braking force BPR decreases to the limit value BPR_Lim, but the decrease gradient becomes a gradient depending on the target braking force BPT at that time (step S37). That is, as the target braking force BPT is large, the regenerative braking force BPR gradually decreases. Moreover, since the regenerative braking force BPR at the subsequent fourth timing t24 (actual regenerative braking force BPR_Real) is equal to the limit value BPR_Lim (NO in step S35), the regenerative decrease control is terminated. For that reason, during the period from the fourth timing t24 to the fifth timing t25 in which the switching control is started, since the target braking force BPT does not change, the regenerative braking force BPR is held at the value of the fourth timing t24.

In addition, as described above, at the third timing t23, communication between the first and second master chambers 621 and 622 and the atmospheric pressure reservoir 53 is blocked. For that reason, since the regenerative decrease control is performed during the period from the third timing t23 to the fourth timing t24, the brake fluid is pumped up by the operation of the brake actuator 30 from the interior of the first and second master chambers 621 and 622, and the amount of brake fluid in the first and second master chambers 621 and 622 decreases. As a result, the first and second master pistons 611 and 612 slide in the braking direction (see FIG. 3), and the operational reaction force with respect to the brake pedal 21 gradually decreases. For that reason, when the braking operation force of the driver becomes approximately constant, the brake pedal 21 is displaced in the operating direction in conjunction with the sliding movement of the first and second master pistons 611 and 612. That is, the actual amount of displacement X of the brake pedal 21 in the operating direction gradually increases.

However, as the target braking force BPT is great, that is, as the amount of hydraulic braking force BPP increased by the regenerative decrease control is large, the decrease speed of the regenerative braking force BPR and the increase speed of the hydraulic braking force BPP slows down. For that reason, the decrease speed of the operational reaction force due to the implementation of the regenerative decrease control slows down. Therefore, even if the actual amount of displacement X of the brake pedal 21 due to the implementation of the regenerative decrease control is large, the brake pedal 21 is slowly displaced in the operating direction.

Moreover, when reaching the fifth timing t25, the vehicle speed VS of the vehicle reaches the start determination value VSTh1 (NO in step S17), and the switching control is started (step S19). In this case, the brake actuator 30 is activated to increase the hydraulic braking force BPP in accordance with the reduction in the regenerative braking force BPR. As a result, since the brake fluid decreases from the interior of the first and second master chambers 621 and 622, the first and second master pistons 611 and 612 slide in the braking direction (FIG. 3), and the operational reaction force to the brake pedal 21 decreases. In this case, since the braking operation force of the driver is constant, the brake pedal 21 is displaced in the operating direction. Moreover, at the sixth timing t26, the vehicle speed VS reaches the termination determination value VSTh2 (see FIGS. 5A to 5C), the regenerative braking force BPR becomes "0 (zero)", and the switching control is terminated.

Here, as illustrated by the two-dot chain line in FIG. 10C, in the case of a comparative example that does not perform the regenerative decrease control, the regenerative braking force BPR at the fifth timing t25, that is, the regenerative braking force BPR at the start of switching control is large, and the decrease speed of the regenerative braking force BPR is high. In this case, the decrease speed of the brake fluid from the interior of the first and second master chambers 621 and 622 at the time of increasing the hydraulic braking force BPP becomes higher, and the decrease speed of the operational reaction force with respect to the brake pedal 21 becomes higher. That is, when the braking operation force of the driver is constant, the displacement speed of the brake pedal 21 in the operating direction also becomes higher.

In contrast, in this embodiment, by performing the regenerative decrease control prior to the switching control, it is possible to set the regenerative braking force BPR at the fifth timing t25 to be smaller than the case of the comparative example. For that reason, the amount of decrease in the operational reaction force with respect to the brake pedal 21 becomes smaller, and the decrease speed of the operational reaction force slows down. That is, as compared to the comparative example illustrated by the two-dot chain line in FIG. 10D, the amount of displacement X of the brake pedal 21 in the operating direction during the switching control becomes smaller, and the displacement speed of the brake pedal 21 in the operating direction slows down.

As described above, according to the above-described configurations and operations, it is possible to obtain the following effects.

(1) In the control device 100 as the vehicle braking control device according to this embodiment, during the braking operation of the driver, the target braking force BPT is calculated for each predetermined control cycle. It is possible to predict that, as the target braking force BPT calculated before the start of the switching control is large, the amount of decrease in the operational reaction force with respect to the brake pedal 21 increases when the switching control is assumed to be performed from this point of time. Therefore, as the target braking force BPT calculated before the start of the switching control is great, the regenerative braking force BPR at the time when the switching control is actually started decreases. For that reason, if the switching control is actually performed, the amount of increase in the hydraulic braking force BPP decreases, and the amount of decrease in the brake fluid from the interior of the first and second master chambers 621 and 622 decreases. As a result, the amount of decrease in operational reaction force with respect to the brake pedal 21 during the switching control decreases, and the decrease speed of operational reaction force slows down. That is, when the braking operation force of the driver is approximately constant, the amount of displacement of the brake pedal 21 in the operating direction during the switching control decreases, and the displacement speed of the brake pedal 21 in the operating direction slows down. Thus, even when the brake pedal 21 is displaced in the operating direction by the implementation of the switching control, it is possible to reduce the uncomfortable feeling that is felt by the driver due to the displacement. Therefore, it is possible to suppress a decrease in drivability when implementing the switching control.

(2) In the control device 100 as the vehicle braking control device according to this embodiment, as the target braking force BPT is large, the limit value BPR_Lim of the regenerative braking force decreases. Moreover, when the regenerative braking force BPR is equal to or less than the limit value BPR_Lim at that time, the second motor 14 is controlled so that the regenerative braking force BPR does not exceed the limit value BPR_Lim. For that reason, as the target braking force BPT is large, the regenerative braking force BPR at the time when the switching control is actually started easily decreases. That is, by setting the limit value BPR_Lim of the regenerative braking force to a value depending on the target braking force BPT in this manner, it is possible to achieve a configuration in which the amount of displacement of the brake pedal 21 in the operating direction is reduced during the switching control.

(3) However, in a state in which the target braking force BPT is greater than the defined decrease amount correlation value BPT_Th1, the regenerative braking force BPR may exceed the limit value BPR_Lim at that time. In such a case, basically, it is preferred to reduce the regenerative braking force BPR to the limit value BPR_Lim or less, and to perform the regenerative decrease control of increasing the hydraulic braking force BPP prior to the switching control.

However, when operating the brake actuator 30 in a state in which the brake pedal 21 is further stepped on, the load on the supply pumps 381 and 382 increases. That is, if the brake pedal 21 is further stepped on in the state in which the communication between the first and second master chambers 621 and 622 and the atmospheric pressure reservoir 53 is blocked, the brake fluid in the first and second master chambers 621 and 622 is supplied into the wheel cylinders 22a to 22d through a pathway in which the differential pressure regulating valves 321 and 322 are positioned. At this time, when the differential pressure regulating valves 321 and 322 are operated so as to increase the differential pressure between the master cylinder 51 and the wheel cylinders 22a to 22d, as the differential pressure (that is, indicated differential pressure) to be generated is great, the flow resistance when the brake fluid flows through the pathway increases. As a result, the brake fluid is less likely to be supplied into the wheel cylinders 22a to 22d from the first and second master chambers 621 and 622 through the pathway. Meanwhile, the supply pumps 381 and 382 are operated to pump up the brake fluid in the first and second master chambers 621 and 622. Therefore, at least a part of the brake fluid to be supplied into the wheel cylinders 22a to 22d through the pathway along with the further stepping-on of the brake pedal 21 by the driver flows to the supply pumps 381 and 382 side through the master side flow passages 401 and 402. As a result, the brake fluid is excessively supplied to the supply pumps 381 and 382 from the first and second master chambers 621 and 622, and the load on the supply pumps 381 and 382 increases.

In this respect, in the control device 100 as the vehicle braking control device according to this embodiment, even if the regenerative braking force BPR exceeds the limit value BPR_Lim at that time in the state in which the target braking force BPT is greater than the defined decrease amount correlation value BPT_Th1, when the brake pedal 21 is in the course of being further stepped on, the regenerative braking force BPR is held without performing the regenerative decrease control. This makes it possible to suppress an increase in the load on the supply pump 381 and 382 as described above.

(4) Meanwhile, in state in which the target braking force BPT is greater than the defined decrease amount correlation value BPT_Th1, the regenerative braking force BPR exceeds the limit value BPR_Lim at that time, and when the brake pedal 21 is not further stepped on, the regenerative decrease control is performed prior to the switching control. In this case, when increasing the hydraulic braking force BPP by the implementation of the regenerative decrease control, since the brake fluid is not excessively supplied to the supply pumps 381 and 382 side from the interior of the first and second master chambers 621 and 622, the load on the supply pumps 381 and 382 does not increase. Moreover, by performing the regenerative decrease control prior to the switching control in this way, it is possible to reduce the regenerative braking force BPR when the switching control is actually started. Therefore, it is possible to reduce the amount of displacement of the brake pedal 21 in the operating direction at the time of switching control.

(5) Furthermore, in the regenerative decrease control, since a decrease in the regenerative braking force BPR is compensated by an increase in the hydraulic braking force BPP, the brake fluid decreases from the interior of the first and second master chambers 621 and 622, and the operational reaction force with respect to the brake pedal 21 decreases. If the braking operation force of the driver is approximately constant, the brake pedal 21 is displaced in the operating direction. As the target braking force BPT is great, the decrease speed of the brake fluid in this case slows down. As a result, as the amount of decrease in the regenerative braking force BPR according to the implementation of regenerative decrease control is large, the decrease speed of the operational reaction force with respect to the brake pedal 21 slows down. That is, when the braking operation force of the driver is approximately constant, the speed of displacement of the brake pedal 21 in the operating direction slows down. Therefore, even if the brake pedal 21 is displaced in the operating direction by the implementation of the regenerative decrease control, a decrease in drivability during the regenerative decrease control can be suppressed as much as the displacement speed can be slowed down.

In addition, the above-described embodiments may be changed to other embodiments as follows.

If the driver performs the braking operation, in the brake control unit 104, the predicted value of the decrease speed of the regenerative braking force in the case of performing the switching control may be calculated for each predetermined control cycle. In addition, a predicted value DBPR of the decrease speed of the regenerative braking force BPR can be calculated, based on the magnitude of the regenerative braking force BPR and the target braking force BPT at the time of calculation. That is, as the regenerative braking force BPR at the start of the switching control is great, the decrease speed of the regenerative braking force BPR when performing the control easily becomes higher, and as the target braking force BPT at the start of the control is great, since it is possible to estimate that the vehicle deceleration DVS increases, the decrease speed easily becomes higher.

Moreover, the decrease speed of the regenerative braking force BPR in regenerative decrease control may be smaller than the predicted value DBPR of the decrease speed of the regenerative braking force BPR that is calculated at the start of the regenerative decrease control as the timing before the switching control is actually started. In this case, the brake control unit 104 configured to calculate the predicted value DBPR also functions as "decrease speed prediction unit" that predicts the decrease speed of the regenerative braking force when performing the switching control during the braking operation.

According to this configuration, the decrease speed of the brake fluid from the interior of the first and second master chambers 621 and 622 during the regenerative decrease control can be set to be lower than the decrease speed of the brake fluid from the interior of the first and second master chambers 621 and 622 during the switching control. In this case, the decrease speed of the operational reaction force with respect to the brake pedal 21 due to implementation of the regenerative decrease control can be set to be lower than the decrease speed of the operational reaction force with respect to the brake pedal 21 due to implementation of the switching control. That is, when the braking operation force of the driver during implementation of the regenerative decrease control is approximately equal to the braking operation force of the driver during implementation of the switching control, the displacement speed of the brake pedal 21 in the operating direction due to implementation of the regenerative decrease control can be set to be lower than the displacement speed of the brake pedal 21 in the operating direction due to implementation of the switching control. Therefore, it is possible to suppress a decrease in drivability due to the implementation of the regenerative decrease control.

In addition, when determining the decrease speed of the regenerative braking force BPR and the increase speed of the hydraulic braking force BPP in the regenerative decrease control based on the predicted value DBPR of the decrease speed of the regenerative braking force BPR in this way, the decrease speed of the regenerative braking force BPR and the increase speed of the hydraulic braking force BPP may be determined, without taking the target braking force BPT at that time into account.

Regardless of the magnitude of the regenerative braking force BPR and the target braking force BPT at that time, the decrease speed of the regenerative braking force BPR during the regenerative decrease control may be a fixed value that is set in advance.

In the above-described embodiment, in the state in which the target braking force BPT is greater than the defined decrease amount correlation value BPT_Th1, even if the regenerative braking force BPR exceeds the limit value BPR_Lim at that time, the regenerative decrease control is not performed when the brake pedal 21 is in the course of being further stepped on. However, even in such a case, the regenerative decrease control may be performed only if specific conditions are satisfied. For example, as the specific conditions, there is a condition in which the difference between the regenerative braking force BPR and the limit value BPR_Lim at that time is less than the defined difference. In this case, since the amount of decrease in the brake fluid from the interior of the first and second master chambers 621 and 622 during the regenerative decrease control is small, it is possible to reduce the amount of increase in the load on the supply pumps 381 and 382.

In the above-described embodiment, the limit value BPR_Lim of the regenerative braking force is determined based on the target braking force BPT instead of the operational reaction force decrease predicted value ΔBP. However, the operational reaction force decrease predicted value ΔBP may be actually calculated to determine the limit value BPR_Lim, based on the operational reaction force decrease predicted value ΔBP. As described above, as the MC pressure Pmc is high, the amount of decrease in operational reaction force with respect to the brake pedal 21 due to the implementation of the switching control is likely to increase. For that reason, as the MC pressure Pmc is high, the operational reaction force decrease predicted value ΔBP may increase. According to this configuration, it is possible to obtain the same effects as above (1) and (2). In this case, the MC pressure Pmc corresponds to the "correlation value" that correlates to the amount of decrease in operational reaction force with respect to the brake pedal 21.

In addition, as the WC pressure Pwc is low, the amount of decrease in operational reaction force with respect to the brake pedal 21 during the switching control is likely to increase. That is, FIG. 11 illustrates a relation between the WC pressure Pwc and an amount of consumption fluid Y as an amount of brake fluid required for increasing the WC pressure Pwc. As illustrated in FIG. 11, as the WC pressure Pwc is low, the amount of consumption fluid Y of brake fluid required for increasing the WC pressure Pwc increases. For example, the amount of brake fluid required for increasing the WC pressure Pwc from an eleventh hydraulic pressure Pwc11 to a twelfth hydraulic pressure Pwc12 higher than the eleventh hydraulic pressure Pwc11 by a predetermined amount ΔPwc1 is assumed to be a first amount of consumption fluid ΔY1. In addition, the amount of brake fluid required for increasing the WC pressure Pwc from a twenty-first hydraulic pressure Pwc21 higher than the twelfth fluid pressure Pwc12 to a twenty-second hydraulic pressure Pwc22 higher than the twenty-first hydraulic pressure Pwc21 by a predetermined amount ΔPwc1 is assumed to be a second amount of consumption fluid ΔY2. In this case, the first amount of consumption fluid ΔY1 becomes greater than the second amount of consumption fluid ΔY2. That is, when performing the switching control in a state in which the WC pressure Pwc is low, the amount of decrease in brake fluid from the interior of the first and second master chambers 621 and 622 becomes larger than the case of performing the switching control in the state in which the WC pressure Pwc is high, and the amount of displacement of the brake pedal 21 in the operating direction is likely to increase.

Therefore, the operational reaction force decrease predicted value ΔBP calculated based on the MC pressure Pmc as described above may be corrected by the WC pressure Pwc to determine the limit value BPR_Lim of the regenerative braking force, based on the operational reaction force decrease predicted value ΔBP after correction. By determining the limit value BPR_Lim in this way, it is possible to improve the accuracy of determination of the limit value BPR_Lim. In this case, the WC pressure Pwc and the amount of consumption fluid Y also correspond to the "correlation value".

Furthermore, the amount of decrease in the operational reaction force with respect to the brake pedal 21 during the switching control may be estimated, based on at least one of the WC pressure Pwc and the amount of consumption fluid Y, without taking the MC pressure Pmc into account.

In addition, the MC pressure Pmc can also be estimated, based on the amount of braking operation of the driver, the braking operation force of the driver, the vehicle deceleration during the braking operation of the driver, and the indicated differential pressure to the differential pressure regulating valves 321 and 322. For that reason, the amount of braking operation of the driver, the braking operation force of the driver, and the vehicle deceleration during the braking operation of the driver can be regarded as the "correlation value". Moreover, the amount of decrease in the operational reaction force with respect to the brake pedal 21 during the switching control may be estimated based on the correlation values.

That is, the amount of decrease in the operational reaction force with respect to the brake pedal 21 during the switching control may be estimated by taking into account all the correlation values, that is, the MC pressure Pmc, the WC pressure Pwc, the amount of consumption fluid Y, the amount of braking operation of the driver, the braking operation force of the driver, the vehicle deceleration during the braking operation of the driver, and the indicated differential pressure to the differential pressure regulating valves 321 and 322. In addition, the amount of decrease in the operational reaction force with respect to the brake pedal 21 during the switching control may be estimated, by using a part of the correlation values, that is, the MC pressure Pmc, the WC pressure Pwc, the amount of consumption fluid Y, the amount of braking operation of the driver, the braking operation force of the driver, the vehicle deceleration during the braking operation of the driver, and the indicated differential pressure to the differential pressure regulating valves 321 and 322.

- As long as the booster device equipped in the hydraulic supply device 50 is a device in which the brake pedal 21 is displaced according to the sliding movement of the master piston, another device other than the device configured to assist the braking operation force by utilizing the operation of the engine 11 may be used. For example, the booster device may be a hydraulic booster device.
- As long as the brake actuator has a so-called inline type configuration equipped with a differential pressure regulating valve, and a supply pump capable of pumping up the brake fluid from the interior of the first and second master chambers 621 and 622 of the master cylinder 51, it may have another configuration other than the above-described brake actuator 30.
- The master cylinder may be configured so that the timing at which communication between the first and second master chambers 621 and 622 and the atmospheric pressure reservoir 53 is blocked (also referred to as "blocking timing") is different from the timing at which the regenerative braking force applied to the vehicle by the second motor 14 as the regenerative braking device coincides with the limit value BPR_up (also referred to as a "limit arrival timing"). For example, the master cylinder may be configured so that the blocking timing is lower than the limit arrival timing. In this case, even if the regenerative braking force applied to the vehicle by the second motor 14 reaches the limit value BPR_up, the communication between the first and second master chambers 621 and 622 and the atmospheric pressure reservoir 53 still continues, and when the brake pedal 21 is further stepped on, the communication between the first and second master chambers 621 and 622 and the atmospheric pressure reservoir 53 is blocked.
- As long as the vehicle equipped with the braking control device of the above-described embodiment is a vehicle equipped with the engine 11, it may be a single-motor type hybrid vehicle, other than a dual-motor type hybrid vehicle. Furthermore, as long as the booster device is a hydraulic booster device, a vehicle may be an electric vehicle that is not equipped with the engine 11. Furthermore, when a generator is equipped as a regenerative braking device, the vehicle may be equipped with only the engine 11 as a driving source.

As long as the brake operating member is operated by the driver, it may be any other members (for example, a brake lever) other than the brake pedal 21.

What is claimed is:

1. A vehicle braking control device that is applied to a vehicle, the vehicle including a regenerative braking device that gives a regenerative braking force to the vehicle, and a hydraulic braking device that has a differential pressure regulating valve disposed in a pathway between a master cylinder configured to generate hydraulic pressure depending on a braking operation within a master chamber and a wheel cylinder provided for a wheel, and a supply pump configured to pump up a brake fluid from the interior of the master chamber and discharge the brake fluid to the pathway of the wheel cylinder side rather than the differential pressure regulating valve, and generates a hydraulic braking force with respect to the vehicle, by adjusting the differential pressure between the master cylinder and the wheel cylinder by operation of the differential pressure regulating valve and the supply pump, the vehicle braking control device performing a switching control which decreases the regenerative braking force by controlling the regenerative braking device, and increases the hydraulic braking force by pumping up the brake fluid from the master chamber by the supply pump and supplying the brake fluid into the wheel cylinder, in conjunction with deceleration of the vehicle during braking operation in which a brake operating member is operated, and when a direction in which the brake operating member is displaced to increase the hydraulic pressure in the master chamber is assumed to be an operating direction, the vehicle braking control device comprising:

a correlation value output unit that outputs a correlation value that correlates to an amount of decrease in operational reaction force acting on the brake operating member in a direction opposite to the operating direction during the braking operation, prior to start of the switching control; and a control unit that controls the regenerative braking device so that, as the amount of decrease in operational reaction force indicated by the correlation value being output from the correlation value output unit is large, the regenerative braking force at the start of the switching control decreases, wherein the control unit is adapted to control the regenerative braking device so that the regenerative braking force does not decrease, when conditions are satisfied in which the amount of decrease in the operational reaction force indicated by the correlation value being output from the correlation value output unit is greater than a determined value, the regenerative braking force applied to the vehicle by the regenerative braking device is greater than a predetermined limit value, and the amount of operation of the brake operating member increases, and the braking control device is equipped with a limit value determining unit that reduces the predetermined limit value, as the amount of decrease in the operational reaction force indicated by the correlation value being output from the correlation value output unit is large.

2. The vehicle braking control device according to claim 1, wherein the control unit is adapted to control the regenerative braking device so that, when the regenerative braking force applied to the vehicle by the regenerative braking device is equal to or lower than the predetermined limit value, the regenerative braking force does not exceed the predetermined limit value.

3. The vehicle braking control device according to claim 1, wherein the control unit is adapted to perform a regenerative decrease control that decreases the regenerative braking force to be equal to or lower than the predetermined limit value and increases the hydraulic braking force, prior to the switching control, when conditions are satisfied in which the amount of decrease in the operational reaction force indicated by the correlation value being output from the correlation value output unit is greater than a determined value, the regenerative braking force applied to the vehicle by the regenerative braking device is greater than the predetermined limit value, and the amount of operation of the brake operating member does not increase.

4. The vehicle braking control device according to claim 3, wherein the control unit slows down a decrease speed of the regenerative braking force and an increase speed of the hydraulic braking force in the regenerative decrease control, as the amount of decrease in the operational reaction force indicated by the correlation value being output from the correlation value output unit is large.

5. The vehicle braking control device according to claim 3, further comprising: a decrease speed prediction unit that outputs a predicted value of a decrease speed of the regenerative braking force in the switching control prior to the start of the switching control, wherein the control unit slows down the decrease speed of the regenerative braking force and an increase speed of the hydraulic braking force in the regenerative decrease control, rather than the decrease speed of the regenerative braking force being output from the decrease speed prediction unit.

6. A vehicle braking control device that is applied to a vehicle, the vehicle including a regenerative braking device that gives a regenerative braking force to the vehicle, and a hydraulic braking device that has a differential pressure regulating valve disposed in a pathway between a master cylinder configured to generate hydraulic pressure depending on a braking operation within a master chamber and a wheel cylinder provided for a wheel, and a supply pump configured to pump up a brake fluid from the interior of the master chamber and discharge the brake fluid to the pathway of the wheel cylinder side rather than the differential pressure regulating valve, and generates a hydraulic braking force with respect to the vehicle, by adjusting the differential pressure between the master cylinder and the wheel cylinder by operation of the differential pressure regulating valve and the supply pump, the vehicle braking control device performing a switching control which decreases the regenerative braking force by controlling the regenerative braking device, and increases the hydraulic braking force by pumping up the brake fluid from the master chamber by the supply pump and supplying the brake fluid into the wheel cylinder, in conjunction with deceleration of the vehicle during braking operation in which a brake operating member is operated, and when a direction in which the brake operating member is displaced to increase the hydraulic pressure in the master chamber is assumed to be an operating direction, the vehicle braking control device comprising:
a correlation value output unit that outputs a correlation value that correlates to an amount of decrease in operational reaction force acting on the brake operating member in a direction opposite to the operating direction during the braking operation, prior to start of the switching control; and
a control unit that controls the regenerative braking device so that, as the amount of decrease in operational reaction force indicated by the correlation value being output from the correlation value output unit is large, the regenerative braking force at the start of the switching control decreases,
wherein the control unit is adapted to control the regenerative braking device so that, when the regenerative braking force applied to the vehicle by the regenerative braking device is equal to or lower than a predetermined limit value, the regenerative braking force does not exceed the predetermined limit value, and the braking control device is provided with a limit value determining unit that decreases the predetermined limit value, as the amount of decrease in operational reaction force indicated by the correlation value being output from the correlation value output unit is large.

7. A vehicle braking control device that is applied to a vehicle,
the vehicle including
a regenerative braking device that gives a regenerative braking force to the vehicle, and
a hydraulic braking device that has a differential pressure regulating valve disposed in a pathway between a master cylinder configured to generate hydraulic pressure depending on a braking operation within a master chamber and a wheel cylinder provided for a wheel, and a supply pump configured to pump up a brake fluid from the interior of the master chamber and discharge the brake fluid to the pathway of the wheel cylinder side rather than the differential pressure regulating valve, and generates a hydraulic braking force with respect to the vehicle, by adjusting the differential pressure between the master cylinder and the wheel cylinder by operation of the differential pressure regulating valve and the supply pump,
the vehicle braking control device performing a switching control which decreases the regenerative braking force by controlling the regenerative braking device, and increases the hydraulic braking force by pumping up the brake fluid from the master chamber by the supply pump and supplying the brake fluid into the wheel cylinder, in conjunction with deceleration of the vehicle during braking operation in which a brake operating member is operated, and when a direction in which the brake operating member is displaced to increase the hydraulic pressure in the master chamber is assumed to be an operating direction, the vehicle braking control device comprising:
a correlation value output unit that outputs a correlation value that correlates to an amount of decrease in operational reaction force acting on the brake operating member in a direction opposite to the operating direction during the braking operation, prior to start of the switching control; and
a control unit that controls the regenerative braking device so that, as the amount of decrease in operational reaction force indicated by the correlation value being output from the correlation value output unit is large, the regenerative braking force at the start of the switching control decreases,
wherein the control unit is adapted to perform a regenerative decrease control that decreases the regenerative braking force to be equal to or lower than a predetermined limit value and increases the hydraulic braking force, prior to the switching control, when conditions are satisfied in which the amount of decrease in the operational reaction force indicated by the correlation value being output from the correlation value output unit is greater than a determined value, the regenerative braking force applied to the vehicle by the regenerative braking device is greater than the predetermined limit value, and the amount of operation of the brake operating member does not increase, and the braking control device is equipped with a limit value determining unit that reduces the predetermined limit value, as the amount of decrease in the operational reaction force indicated by the correlation value being output from the correlation value output unit is large.

8. The vehicle braking control device according to claim 7, wherein the control unit slows down a decrease speed of the regenerative braking force and an increase speed of the hydraulic braking force in the regenerative decrease control, as the amount of decrease in the operational reaction force indicated by the correlation value being output from the correlation value output unit is large.

9. The vehicle braking control device according to claim 7, further comprising: a decrease speed prediction unit that outputs a predicted value of a decrease speed of the regenerative braking force in the switching control prior to the start of the switching control, wherein the control unit slows down the decrease speed of the regenerative braking force and an increase speed of the hydraulic braking force in the regenerative decrease control, rather than the decrease speed of the regenerative braking force being output from the decrease speed prediction unit.

* * * * *